United States Patent
Kang et al.

(10) Patent No.: US 11,582,834 B2
(45) Date of Patent: Feb. 14, 2023

(54) METHOD AND APPARATUS FOR DECIDING PACKET COMMUNICATION RANGE IN TERMINAL DIRECT COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/865,872

(22) Filed: May 4, 2020

(65) Prior Publication Data

US 2020/0351981 A1 Nov. 5, 2020

(30) Foreign Application Priority Data

May 2, 2019 (KR) .................. 10-2019-0051440

(51) Int. Cl.
*H04W 80/02* (2009.01)
*H04L 1/18* (2006.01)
(Continued)

(52) U.S. Cl.
CPC ........... *H04W 80/02* (2013.01); *H04L 1/1819* (2013.01); *H04W 4/40* (2018.02); *H04W 28/0278* (2013.01); *H04W 92/18* (2013.01)

(58) Field of Classification Search
CPC ..... H04W 36/00; H04W 36/03; H04W 48/02; H04W 4/06
See application file for complete search history.

(56) References Cited

U.S. PATENT DOCUMENTS 9,241,330 B2  1/2016  Zheng
2009/0235139 A1*  9/2009  Park ................. H04L 1/1819
                                                714/E11.131
(Continued)

FOREIGN PATENT DOCUMENTS

RU  2 682 909 C1  3/2019
RU  2 683 977 C1  4/2019
(Continued)

OTHER PUBLICATIONS

Vivo, 'Different destination service multiplexing in MAC', R2-1903765, 3GPP TSG-RAN WG2 Meeting #105bis, 29 Mar. 29, 2019, sections 1-2.1.
(Continued)

*Primary Examiner* — Khaled M Kassim
*Assistant Examiner* — Berhanu D Belete
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) are provided. The communication method and system may be applied to intelligent services based on the 5G communication technology and the IoT-related technology, such as smart home, smart building, smart city, smart car, connected car, health care, digital education, smart retail, security and safety services. A method and apparatus for determining a reception area of a packet in a V2X system are provided. In described aspects, a reception terminal may receive location information of a transmitting terminal and range information of transmitted data, and may determine whether to provide feedback regarding the transmitted data based on the location information and the range information.

12 Claims, 14 Drawing Sheets

(51) Int. Cl.
*H04L 1/1812* (2023.01)
*H04W 28/02* (2009.01)
*H04W 4/40* (2018.01)
*H04W 92/18* (2009.01)

(56) References Cited

U.S. PATENT DOCUMENTS

| | | | |
|---|---|---|---|
| 2015/0163822 A1* | 6/2015 | Guo | H04W 72/121 370/329 |
| 2015/0257187 A1* | 9/2015 | Kwon | H04W 72/04 370/329 |
| 2016/0219132 A1* | 7/2016 | Lee | H04L 69/22 |
| 2016/0323777 A1* | 11/2016 | Pan | H04B 7/2637 |
| 2017/0006649 A1* | 1/2017 | Zhao | H04W 76/14 |
| 2017/0048903 A1* | 2/2017 | Yi | H04W 72/02 |
| 2017/0094656 A1* | 3/2017 | Chen | H04W 76/14 |
| 2017/0142768 A1* | 5/2017 | Kwon | H04W 72/04 |
| 2017/0150490 A1 | 5/2017 | Chen et al. | |
| 2017/0295559 A1* | 10/2017 | Agiwal | H04W 72/02 |
| 2018/0070264 A1* | 3/2018 | Saiwai | H04W 72/04 |
| 2018/0098299 A1* | 4/2018 | Chae | H04J 11/00 |
| 2018/0132091 A1* | 5/2018 | Adachi | H04W 72/04 |
| 2018/0146467 A1* | 5/2018 | Kim | H04W 80/02 |
| 2018/0263026 A1 | 9/2018 | Loehr et al. | |
| 2018/0295628 A1 | 10/2018 | Lu et al. | |
| 2019/0052436 A1 | 2/2019 | Desai et al. | |
| 2019/0082414 A1 | 3/2019 | Lei | |
| 2019/0327753 A1* | 10/2019 | Lee | H04W 72/14 |
| 2019/0342790 A1* | 11/2019 | Saiwai | H04W 72/04 |
| 2020/0059944 A1* | 2/2020 | Lee | H04W 72/14 |
| 2020/0092692 A1 | 3/2020 | Wang et al. | |
| 2020/0100070 A1* | 3/2020 | Cheng | H04W 28/0268 |
| 2020/0127768 A1* | 4/2020 | Seo | H04B 7/0626 |
| 2020/0145799 A1* | 5/2020 | Baghel | H04L 1/0018 |
| 2020/0146082 A1* | 5/2020 | Chen | H04W 4/40 |
| 2020/0229198 A1* | 7/2020 | Kung | H04W 72/042 |
| 2020/0236588 A1* | 7/2020 | Yi | H04L 69/321 |
| 2020/0260214 A1* | 8/2020 | Wu | H04L 1/1829 |
| 2020/0274649 A1* | 8/2020 | Lee | H04W 72/087 |
| 2020/0314832 A1* | 10/2020 | Baghel | H04W 76/14 |
| 2020/0336872 A1* | 10/2020 | Basu Mallick | H04W 4/40 |
| 2020/0383100 A1* | 12/2020 | Yu | H04W 68/02 |
| 2021/0105789 A1* | 4/2021 | Freda | H04W 4/40 |
| 2021/0153065 A1* | 5/2021 | Adjakple | H04W 4/40 |
| 2021/0258764 A1* | 8/2021 | Zhang | H04W 8/005 |

FOREIGN PATENT DOCUMENTS

| | | |
|---|---|---|
| WO | 2018/028694 A1 | 2/2018 |
| WO | 2018/120871 A1 | 7/2018 |
| WO | 2018/171540 A1 | 9/2018 |
| WO | 2019/029652 A1 | 2/2019 |

OTHER PUBLICATIONS

Huawei et al., 'On reception of MAC PDU in NR SL', R2-1904091, 3GPP TSG-RAN WG2 Meeting 105bis, 29 Mar. 29, 2019, section 2.

Ericsson, 'On the use of communication range at access stratum', R2-1904711, 3GPP TSG-RAN WG2 #105bis, 29 Mar. 29, 2019, section 2.

SA2, 'LS response on unicast, groupcast and broadcast in NR sidelink', S2-1904823, SA WG2 Meeting #S2-132, 13 Apr. 13, 2019, sections 1-2.

International Search Report dated Aug. 13, 2020, issued in International Application No. PCT/KR2020/005862.

Spreadtrum Communications: "Logical channel prioritization Consideration", 3GPP Draft; R2-1905680 Logical Channel Priorization Consideration, 3rd Generation Partnership Project (3GPP), RAN WG2, No. Reno, USA; May 13, 2019-May 17, 2019.

Qualcomm Incorporated: "Physical layer procedures for sidelink", 3GPP Draft; R1-1905012 Physical Layer Procedures for Sidelink, 3rd Generation Partnership Project (3GPP), RAN WG1, No. Xian, China; Apr. 8, 2019-Apr. 12, 2019.

Russian Office Action dated Oct. 1, 2021, issued in Russian Application No. 2021111669.

European Search Report dated Sep. 23, 2021, issued in European Application No. 20798101.0.

Indian Office Action dated Feb. 10, 2022, issued in Indian Application No. 202137018146.

* cited by examiner

METHOD AND APPARATUS FOR DECIDING PACKET COMMUNICATION RANGE IN TERMINAL DIRECT COMMUNICATION SYSTEM

CROSS-REFERENCE TO RELATED APPLICATION(S)

This application is based on and claims priority under 35 U.S.C. § 119(a) of a Korean patent application number 10-2019-0051440, filed on May 2, 2019, in the Korean Intellectual Property Office, the disclosure of which is incorporated by reference herein in its entirety.

BACKGROUND

1. Field

The disclosure relates to a method and apparatus for determining a packet reception area at a reception terminal in a direct communication system between terminals. More particularly, the disclosure relates to a method and apparatus for determining a packet reception area of a terminal in a vehicle to everything (V2X) system of a next-generation mobile communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology. In addition, vehicle-to-everything (V2X) using a 5G communication system is being studied, and it is expected that various services can be provided to users using V2X.

The above information is presented as background information only to assist with an understanding of the disclosure. No determination has been made, and no assertion is made, as to whether any of the above might be applied as a prior art with regard to the disclosure.

SUMMARY

Aspects of the disclosure are to address at least the above-mentioned problems and/or disadvantages and to provide at least the advantages described below. Accordingly, an aspect of the disclosure is to provide an improved communication method and apparatus in a communication system.

Another aspect of the disclosure is to provide a method and apparatus for determining a packet reception area for a target terminal to receive a packet in a direct communication system between terminals.

Another aspect of the disclosure is to provide a method and apparatus for determining a packet reception area for a target terminal to receive a packet in a vehicle to everything (V2X) system of a next generation mobile communication system.

Additional aspects will be set forth in part in the description which follows and, in part, will be apparent from the description, or may be learned by practice of the presented embodiments.

In accordance with an aspect of the disclosure, a method for processing a control signal in a wireless communication system is provided. The method includes receiving a first control signal transmitted from a base station, processing the received first control signal, and transmitting a second control signal generated on the basis of the processing to the base station.

In accordance with another aspect of the disclosure, a method of a transmission terminal is provided. The method includes providing, by a reception terminal, information necessary to determine a packet reception area, providing location information of a transmission terminal, providing sidelink control information necessary for receiving a packet, transmitting a sidelink packet, and obtaining feedback for a sidelink packet that requires feedback, wherein the location information of the transmission terminal includes at least one or a combination of absolute location information (latitude, longitude, height, speed, zone ID) or/and includes the difference value changed from the absolute location.

In accordance with another aspect of the disclosure, a method of a reception terminal is provided. The method includes obtaining information for determining a reception area of an SL packet, determining the location of the reception terminal, obtaining location information of a transmission terminal, determining the packet reception area, obtaining sidelink control information, receiving a packet, determining feedback transmission for the packet, and transmitting feedback for the packet, wherein the information used to determine the reception area of the packet includes at least one or a combination of absolute location information (latitude, longitude, height, speed, zone ID) of a transmission base station or/and a difference value changed from the absolute location or/and the destination index of the packet or/and the group index of the packet.

The technical subjects pursued in the disclosure may not be limited to the above-mentioned technical subjects, and other technical subjects which are not mentioned may be clearly understood, through the following descriptions, by those skilled in the art to which the disclosure pertains.

According to an embodiment, it is possible to provide an improved communication method and apparatus in a communication system. In addition, according to an embodiment, it is possible to provide a method and apparatus for determining an improved packet reception area in a direct communication system between terminals. In addition, according to an embodiment, it is possible to provide a method and apparatus for determining an improved packet reception area in a vehicle to everything (V2X) system of a next-generation mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
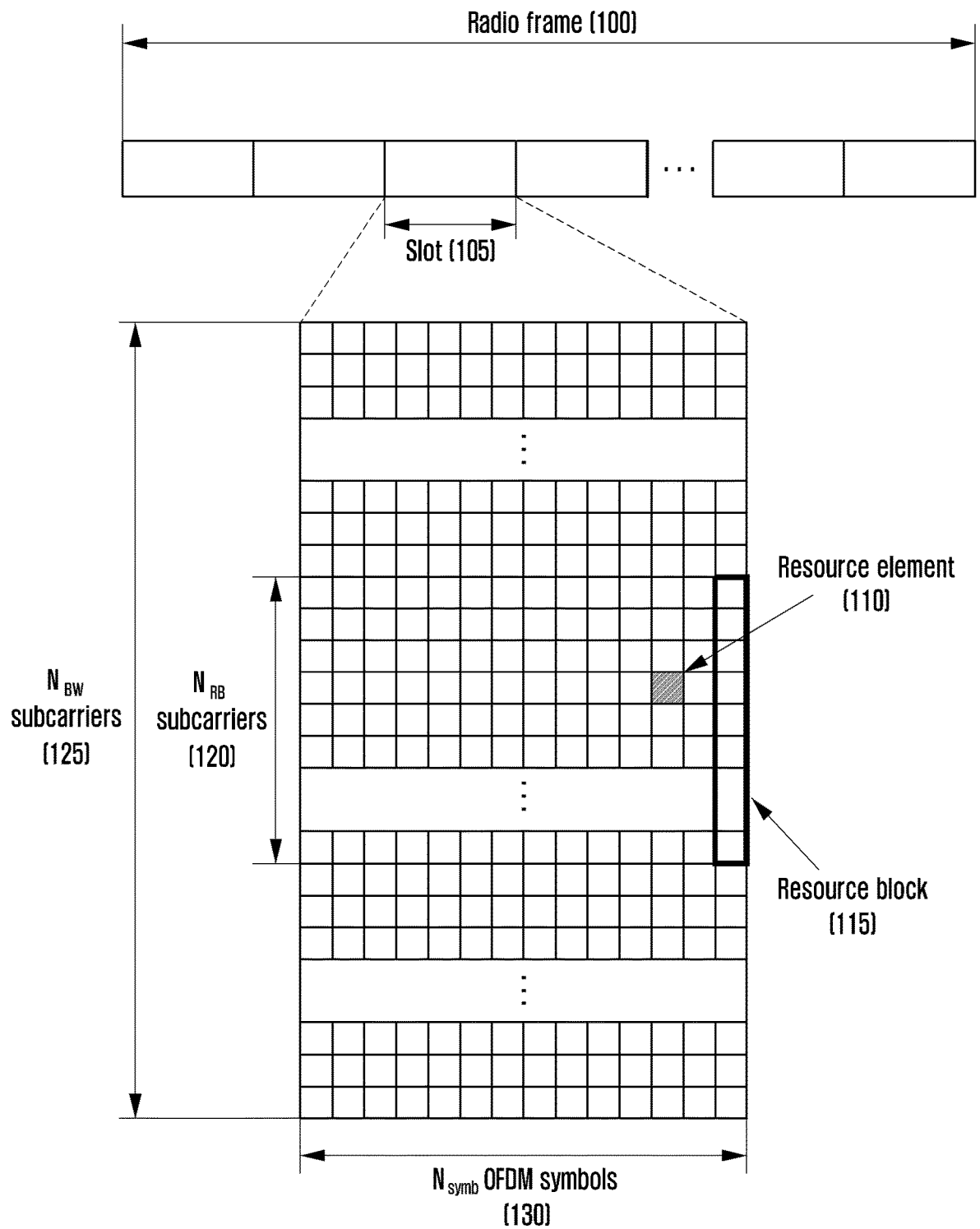
FIG. 1 is a view illustrating a structure of radio time-frequency resource of an NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In describing the embodiments in detail, although the main targets are the wireless access network new RAN (NR) and the packet core (5G system, 5G core network, or next generation core (NG core)), which is the core network of the 5G mobile communication standards specified by the 3$^{rd}$ generation partnership project (3GPP), which is a standardization organization for mobile communication standards, the main subject matter of the disclosure can be applied to other communication systems having similar technical backgrounds with a slight modification within a range not significantly departing from the scope of the disclosure, which will be possible by the judgment of those skilled in the technical field of the disclosure.

In the 5G system, in order to support network automation, a network data collection and analysis function (NWDAF), which is a network function that provides a function for analyzing and providing data collected in a 5G network, may be defined. The NWDAF can collect/store/analyze information from 5G networks and provide the results to unspecified network functions (NF), and the analysis results can be used independently in each NF.

In the following description, the disclosure uses some terms and names defined in 3rd generation partnership project (3GPP) standards (standards for 5G, NR, and LTE systems or similar systems) for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the case of vehicle communication, the standardization work for V2X technology in the LTE system based on the device-to-device (D2D) communication structure has been completed in 3GPP Release 14 and Release 15, and the current V2X technology is based on 5G NR. Efforts are underway to develop the same. The NR V2X will support unicast communication between a terminal and a terminal, groupcast (or multicast) communication, and broadcast communication. In addition, the NR V2X aims to provide more advanced services such as group driving (platooning), advanced driving, extended sensor, and remote driving unlike LTE V2X, which aims to transmit and receive basic safety information necessary for road driving of vehicles.

The V2X service can be divided into basic safety services and advanced services. The basic safety services may include detailed services such as a vehicle notification (CAM or BSM) service, a left turn notification service, a front vehicle collision warning service, an emergency vehicle access notification service, a front obstacle warning service, and an intersection signal information service, etc., and V2X information may be transmitted and received using a broadcast, or unicast, or groupcast transmission method. The advanced service not only has more enhanced QoS requirements than the basic safety service, but also requires a method to transmit and receive V2X information using unicast and groupcast transmission methods in addition to broadcast so that V2X information can be transmitted and received within a specific vehicle group or V2X information between two vehicles. The advanced services may include detailed services such as cluster driving services, autonomous driving services, remote driving services, and extended sensor-based V2X services.

Hereinafter, a sidelink (SL) refers to a signal transmission/reception path between a terminal and another terminal, which may be used interchangeably with the PC5 interface. Hereinafter, a base station is a subject that performs resource allocation of a terminal, and may be a base station supporting both V2X communication and general cellular communication, or a base station supporting only V2X communication. That is, the base station may mean an NR base station (gNB), an LTE base station (eNB), or a road site unit (RSU). The terminal may include not only a general user equipment and a mobile station but also all of a vehicle supporting vehicle-to-vehicle (vehicular-to-vehicular (V2V)) communication, a vehicle supporting vehicle-to-pedestrian (V2P) or pedestrian handset (e.g. a smartphone) communication, a vehicle supporting communication between a vehicle and a network (Vehicular-to-Network, V2N), or an RSU equipped with a vehicle and a terminal function supporting communication between a vehicle and a transportation infrastructure (Vehicular-to-Infrastructure (V2I)), an RSU equipped with a base station function, or an RSU equipped with part of the base station function and part of terminal function. In addition, the V2X terminal used in the following description may also be referred to as a terminal. That is, in connection with V2X communication, the terminal can be used as a V2X terminal.

The base station and the terminal are connected through the Uu interface. Uplink (UL) refers to a radio link through which a terminal transmits data or control signals to a base station, and downlink (DL) refers to a radio link through which a base station transmits data or control signals to a terminal.

FIG. 1 is a view illustrating a structure of radio time-frequency resources of an NR system according to an embodiment of the disclosure.

Referring to FIG. 1, the horizontal axis in the radio resource region represents a time domain and the vertical axis represents a frequency domain. The minimum transmission unit in the time domain is an OFDM symbol or DFT-S-OFDM symbol, and $N_{symb}$ OFDM symbols or DFT-S-OFDM symbols 130 are combined to form one slot 105. Unlike the slot, the length of the subframe in the NR system may be defined as 1.0 ms, and the radio frame 100 may be defined as 10 ms. The minimum transmission unit in the frequency domain is a subcarrier, and the bandwidth of the entire system transmission band may be composed of a total of $N_{BW}$ subcarriers 125. However, these specific values may be variably applied depending on the system.

The basic unit of the time-frequency resource region is a resource element (RE) 110 and may be represented by an OFDM symbol index or DFT-S-OFDM symbol index and a subcarrier index. A resource block (RB) 115 may be defined as $N_{RB}$ consecutive subcarriers 120 in the frequency domain. Generally, the minimum transmission unit of data is an RB unit, and in an NR system, $N_{symb}=14$ and $N_{RB}=12$ are generally used.

The structure of the radio time-frequency resource is applied to the Uu interface, but may be similarly applied to sidelink communication.

Figure 2A:
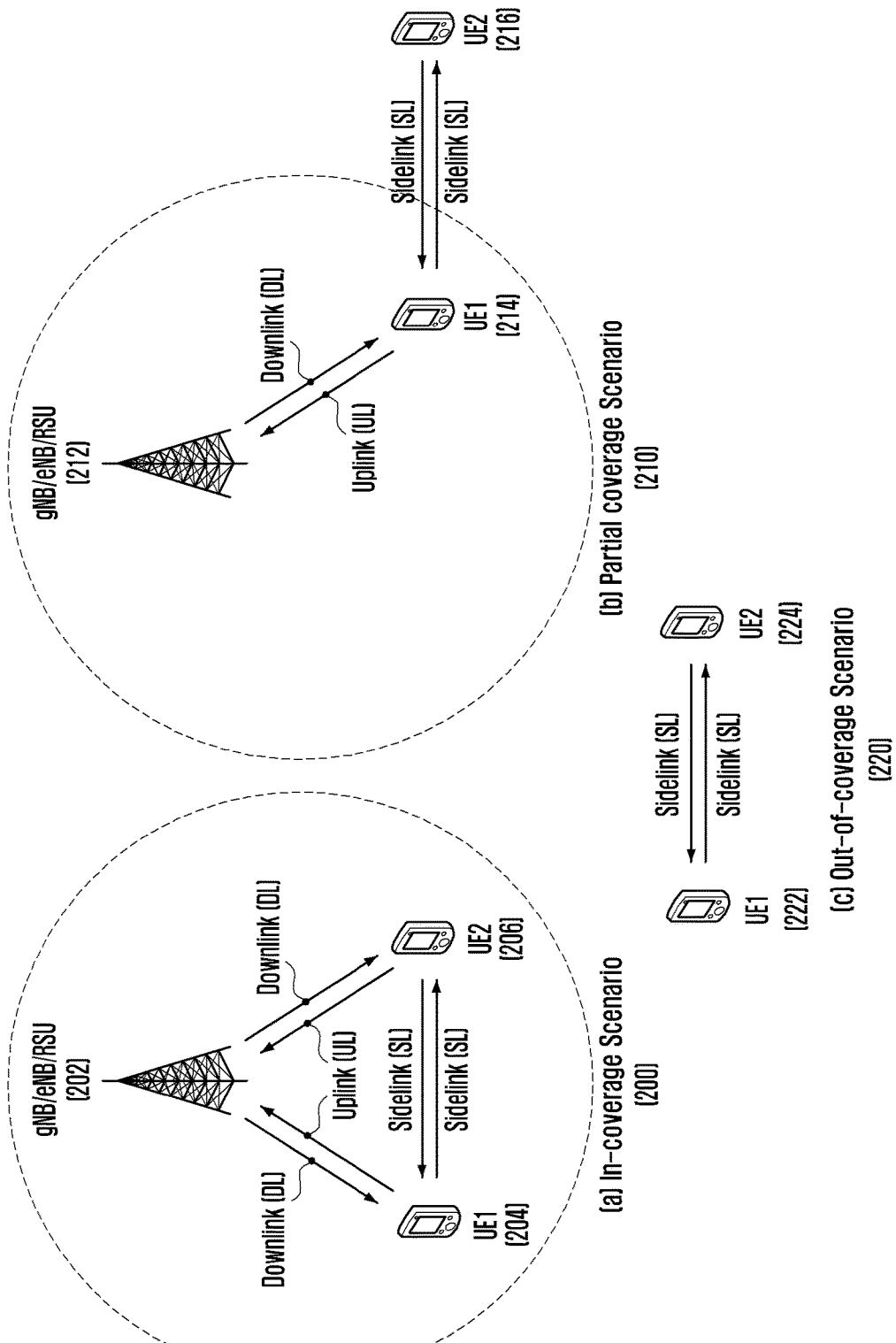
FIG. 2A is a view illustrating a base station coverage of a V2X system according to an embodiment of the disclosure.

FIG. 2A is a view illustrating a base station coverage of a V2X system according to an embodiment of the disclosure.

Referring to FIG. 2A, an in-coverage scenario 200 is a case where all V2X terminals (UE1 204 and UE2 206) are located within the coverage of a base station 202. In this case, all V2X terminals 204 and 206 may receive data and control information from the base station 202 via downlink or transmit data and control information via the uplink to the base station. In this case, the data and control information may be data and control information for V2X communication or data and control information for general cellular communication. In addition, V2X terminals can transmit and receive data and control information for V2X communication through a sidelink.

A partial coverage scenario 210 is a case where UE1 214 among V2X terminals is located within the coverage of the base station 212 and UE2 216 is located outside the coverage of the base station 212. The UE1 214 located within the coverage of the base station 212 may receive data and control information through the downlink from the base station 212 or transmit data and control information through the uplink to the base station 212. The UE2 216 located outside the coverage of the base station 212 cannot receive data and control information through the downlink from the base station 212, and cannot transmit data and control information through the uplink to the base station 212. The UE2 216 may transmit and receive data and control information for V2X communication through UE1 214 and the sidelink.

Out-of-coverage scenario 220 is an example of a case in which all V2X terminals (UE1 (222) and UE2 (224)) are located out-of-coverage of a base station. Accordingly, the UE1 222 and the UE2 224 cannot receive data and control information from the base station via the downlink, and cannot transmit data and control information via the uplink to the base station. The UE1 222 and UE2 224 may transmit and receive data and control information for V2X communication via a sidelink.

Figure 2B:
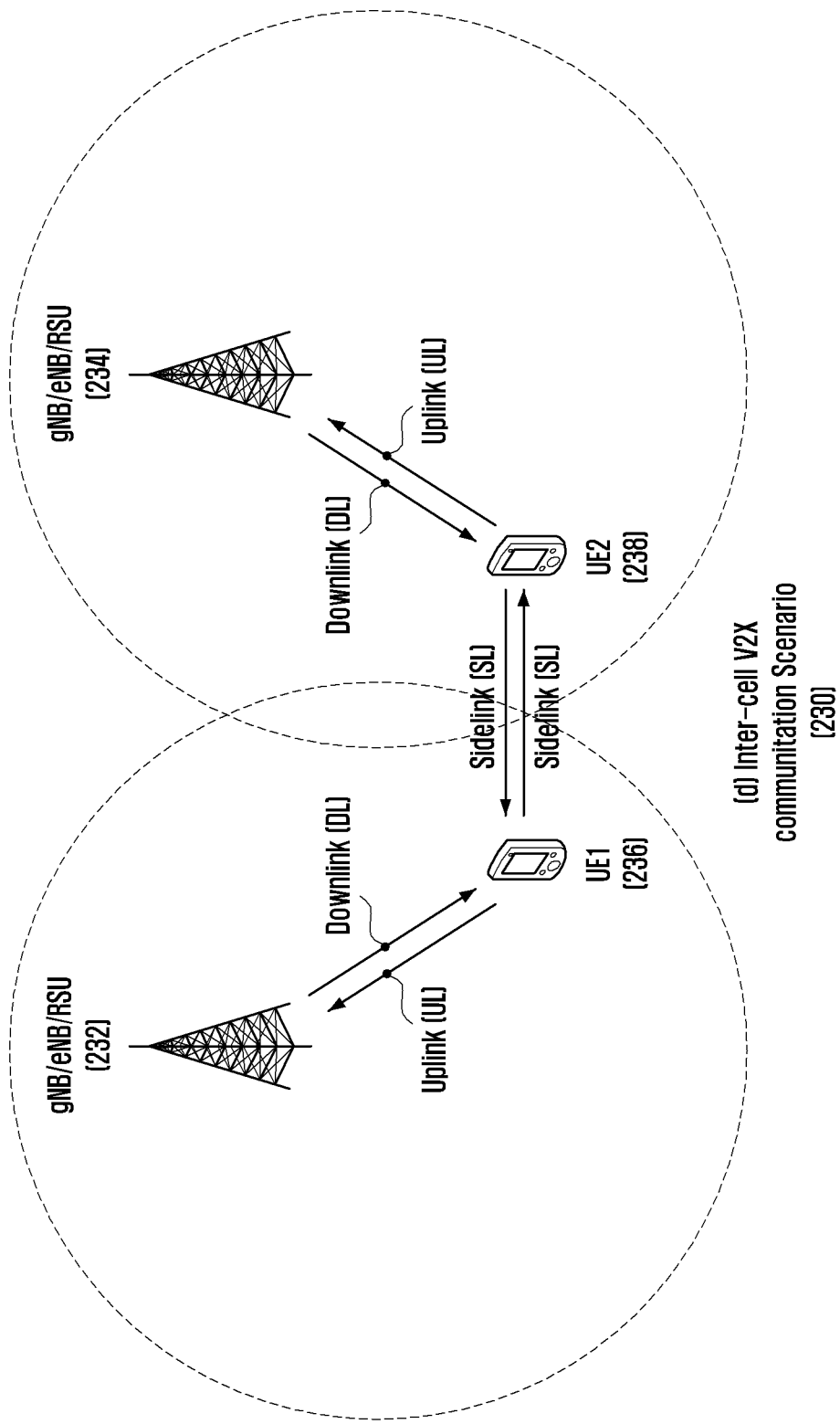
FIG. 2B is a view illustrating a base station coverage of a V2X system according to an embodiment of the disclosure.

FIG. 2B is a view illustrating a base station coverage of a V2X system according to an embodiment of the disclosure.

Referring to FIG. 2B, an inter-cell V2X communication scenario 230 is a scenario for performing V2X communication between terminals located in different cells. Specifically, in an inter-cell V2X communication scenario 230, the V2X transmission terminal and the V2X reception terminal may be connected to different base stations (RRC connected state) or may be camping (RRC disconnected (idle) state or RRC connection inactive (RRC inactive) state). At this time, a UE1 236 may be a V2X transmission terminal and a UE2 238 may be a V2X reception terminal, or a UE1 236 may be a V2X reception terminal and a UE2 238 may be a V2X transmission terminal. With respect to feedback and operation, the transmission terminal may be a terminal transmitting physical sidelink control channel (PSCCH) and physical sidelink shared channel (PSSCH), and the reception terminal may be a terminal receiving PSCCH and PSSCH or a terminal transmitting physical sidelink feedback channel (PSFCH) based on decoding of the PSSCH. The UE1 236 may receive a system information block (SIB) for V2X from a base station 232 to which the UE1 236 is connected (or on which the UE1 236 is camping), and the UE2 238 may receive the SIB for V2X from another base station 234 to which the UE2 238 is connected (or on which the UE2 238 is camping). At this time, the information of SIB for V2X received by the UE1 236 and the information of SIB for V2X received by the UE2 238 may be identical to or different from each other.

FIGS. 2A to 2B illustrate a V2X system composed of two terminals UE1 and UE2 for convenience of description, but is not limited thereto, and various numbers of terminals may participate in the V2X system.

Figure 3:
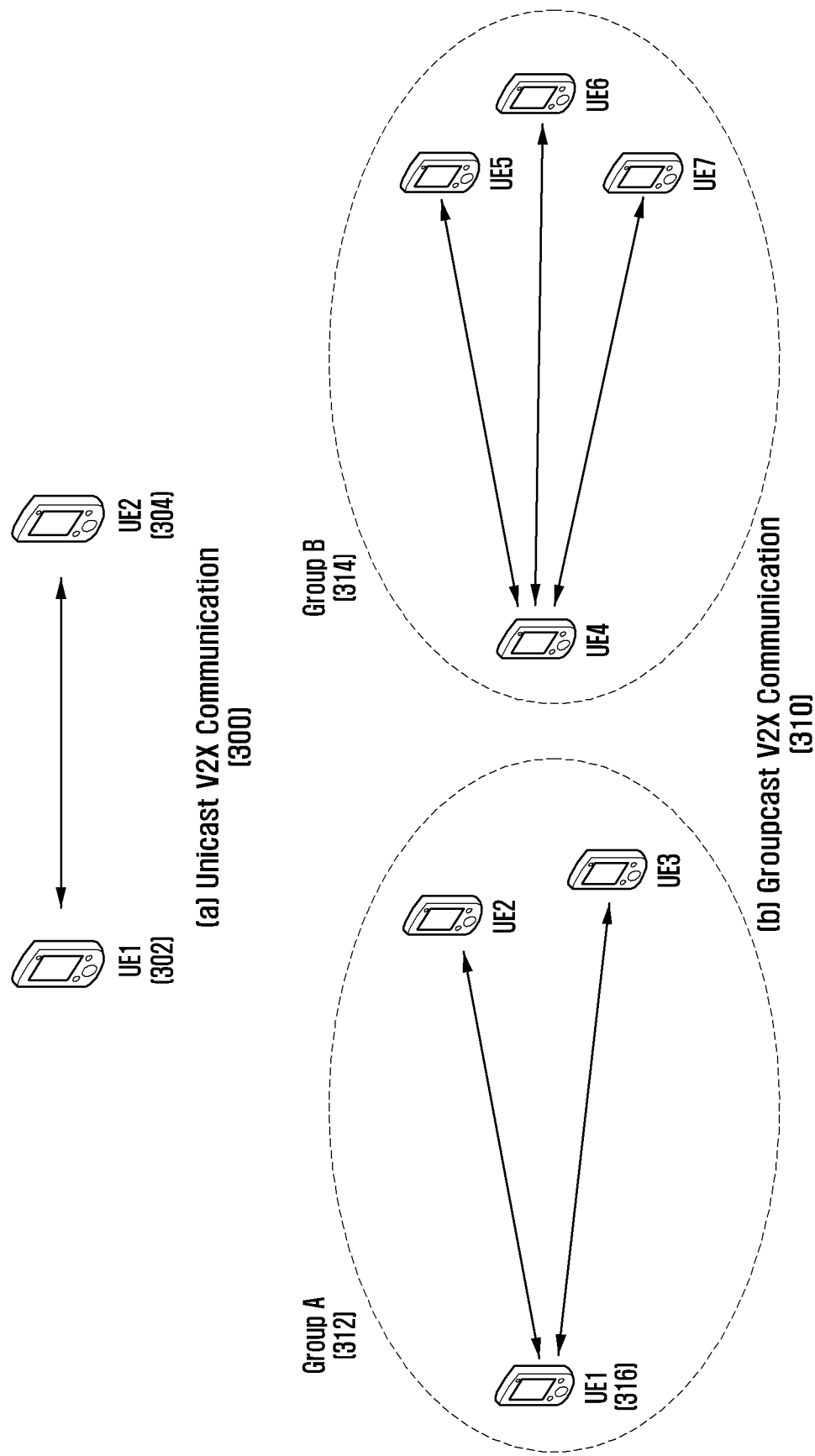
FIG. 3 is a view illustrating V2X communication performed via a sidelink according to an embodiment of the disclosure.

FIG. 3 is a view illustrating V2X communication performed via a sidelink according to an embodiment of the disclosure.

Referring to FIG. 3, the unicast communication 300 is a case in which a transmission terminal (UE1 302 or UE2 304) and a reception terminal (UE2 304 or UE1 302) perform one-to-one communication.

In addition, groupcast or multicast communication 310 is a case in which the transmission terminal and the reception terminal perform one-to-multiple communication. In the groupcast, UE1, UE2, and UE3 form a group (group A, 312) to perform groupcast communication, and UE4, UE5, UE6, and UE7 form another group (group B, 314) to perform groupcast communication. Each terminal performs groupcast communication only within a group to which each terminal belongs, and communication with a terminal in a different group can be achieved by a unicast, groupcast or broadcast communication method. FIG. 3 illustrates an example in which two groups are formed, but is not limited thereto. Each group may include at least one terminal. Also, the terminal may belong to at least two groups.

Meanwhile, although not illustrated in FIG. 3, V2X terminals may perform broadcast communication. Broadcast communication refers to a case in which all V2X terminals receive data and control information transmitted by a V2X transmission terminal through a sidelink. For example, when it is assumed that UE1 316 is a transmission terminal for broadcast in the group cast V2X communication 310, all terminals UE2, UE3, UE4, UE5, UE6, and UE7 may receive the data and control information transmitted by UE1 316.

The sidelink broadcast, groupcast, and unicast communication methods according to an embodiment may be supported in in-coverage, out-of-coverage, and partial-coverage scenarios.

Unlike in LTE V2X, in NR V2X, support of a transmission type in which a vehicle terminal transmits data to only one specific terminal through unicast and a transmission type in which data is transmitted to a specific number of terminals through groupcast may be considered. For example, when considering a service scenario such as platooning, which is a technique of moving two or more vehicles in a cluster by connecting two or more vehicles through one network, such a unicast and groupcast technology may be useful. Specifically, unicast communication may be required for the purpose of controlling a specific terminal by a leader terminal of a group connected by platooning, and groupcast communication may be required for the purpose of simultaneously controlling a group of a plurality of terminals.

In the V2X system, resource allocation can be performed as follows.

Mode 1 Resource Allocation

Scheduled resource allocation is a method in which a base station allocates resources used for sidelink transmission in a dedicated scheduling method to the RRC connected terminals. The scheduled resource allocation method may be effective for interference management and resource pool management (dynamic allocation and/or semi-persistent transmission) because the base station can manage the resources of the sidelink. In a case where there is data to be transmitted to other terminal(s), the RRC connected mode terminal may transmit information informing the base station that there is data to be transmitted to other terminal(s) using an RRC message or a MAC control element (CE). For example, the RRC message may be a sidelink terminal information (Sidelink UEInformation), or terminal assistance information (UEAssistanceInformation) message, and MAC CE may include BSR MAC CE, SR (scheduling request), etc., which includes at least one of an indicator indicating the buffer status report (buffer status report, BSR) for V2X communication and information on the size of data buffered for sidelink communication.

Mode 2 Resource Allocation

Second, terminal autonomous resource selection is a method in which the base station provides the sidelink transmission/reception resource pool for V2X to the terminal as system information or an RRC message (e.g., RRC reconfiguration message, PC5-RRC message), and then selects the resource pool and resources according to a predetermined rule. The terminal autonomous resource selection may correspond to one or a plurality of the following resource allocation methods.

UE autonomously selects sidelink resource for transmission.

UE assists in sidelink resource selection for other UEs.

UE is configured with NR configured grant for sidelink transmission.

UE schedules sidelink transmission of other UEs.

The resource selection method of the terminal may include zone mapping, resource selection based on sensing, and random selection.

Even if the resource is additionally present in the coverage of the base station, resource allocation or resource selection may not be performed in the scheduled resource allocation or terminal autonomous resource selection mode, in this case, the terminal may perform V2X sidelink communication through preconfigured sidelink transmission/reception resource pool.

Further, when the terminals for V2X communication exist outside the coverage of the base station, the terminal may perform V2X sidelink communication through a preconfigured sidelink transmission/reception resource pool.

For a specific V2X application, a target terminal for which the information of the V2X application is valid may be different. For example, a V2X application that is effective for a left-turning vehicle may be unnecessary for a right-turning or straight-moving vehicle. As such, in order to distinguish a terminal to receive a packet of a valid V2X application, a communication range requirement for each packet (or application) may be different. For another example, in the case of the V2X application that should be received by a vehicle turning left, a reliable packet transmission/reception method should be used so that the target left turning vehicle can receive the packet. In this case, a method in which the target terminal transmits hybrid automatic repeat request (HARQ) feedback for the received packet can be used. The packet of the V2X application may be configured to transmit to a group consisting of one or more terminals.

According to an embodiment, a communication range requirement of SL flow to SL packet transmitted and received by one or more terminals belonging to the same group may be different. For example, the communication range of packet A may be configured to be 50 meters, and the communication range of packet B may be configured to be 100 meters. The packet A may be received by terminals located in a region less than or equal to 50 meters from the transmission terminal. For the packet A, reception terminals located in an area smaller than or equal to 50 meters may transmit feedback. The packet B can be received by terminals located in a region less than or equal to 100 meters from the transmission terminal. For the packet B, reception terminals located in an area smaller than or equal to 100 meters may transmit feedback.

According to an embodiment, MAC service data units (MAC SDUs) belonging to SL flow to SL packet having the same communication range requirement may be multiplexed into one MAC protocol data unit (MAC PDU). When the communication range requirements of SL flow to SL packet are different, MAC SDUs belonging to SL flow to SL packet may be configured as separate MAC PDUs. If the communication range requirements of packet 1 and packet 2 are the same, the two packets may be multiplexed to the same MAC PDU. If the communication range requirements of packet 1 and packet 2 are different, the two packets may be configured as separate MAC PDUs, respectively. The operation of the reception terminal or the transmission terminal for this embodiment will be described with reference to FIGS. 4 to 6.

Figure 4:
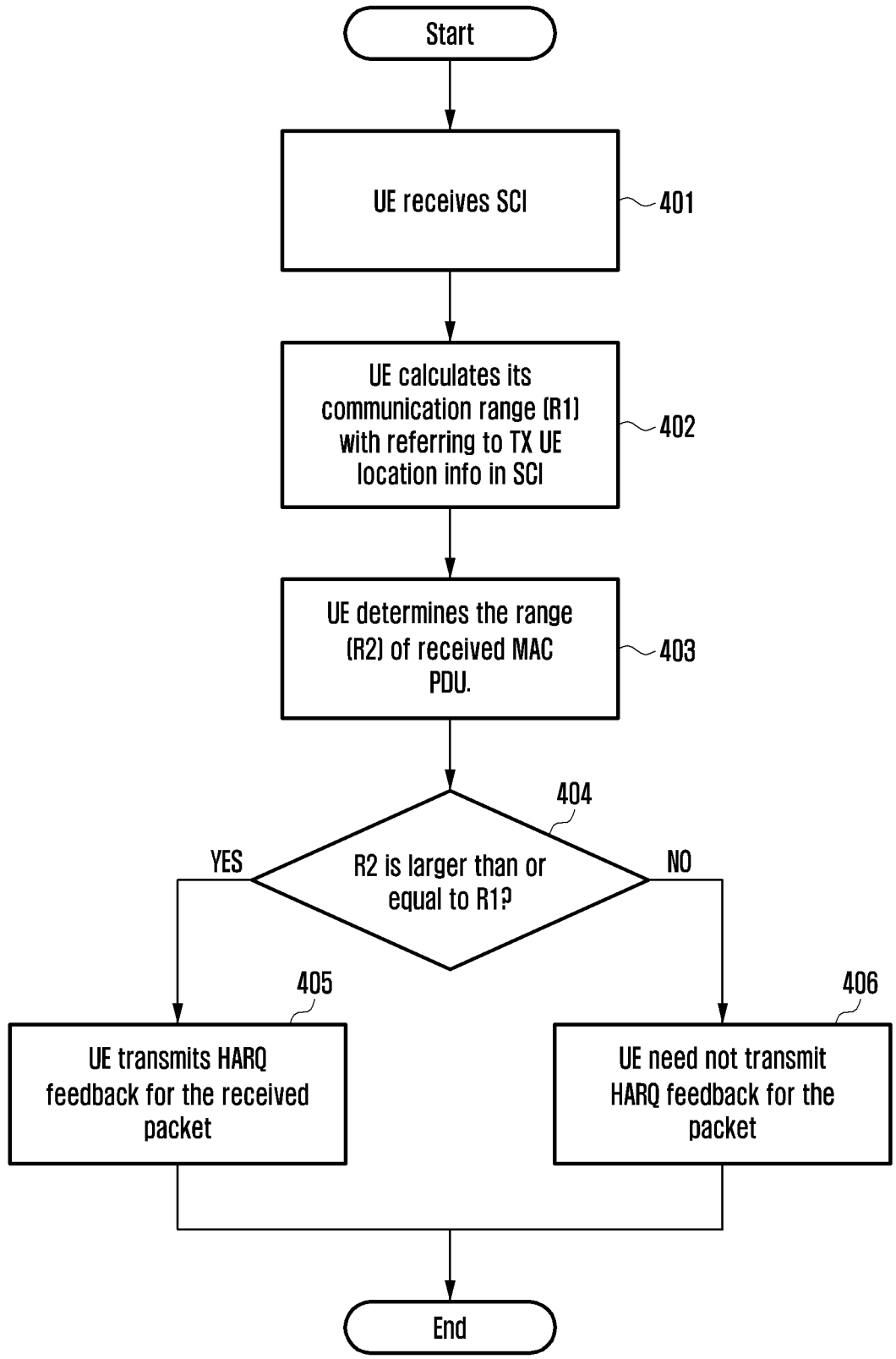
FIG. 4 is a view illustrating an operation of a reception terminal according to an embodiment of the disclosure.

FIG. 4 illustrates an operation of a reception terminal according to an embodiment of the disclosure.

Referring to FIG. 4, in operation 401, the reception terminal may receive sidelink control information (SCI) transmitted by a transmission terminal. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may include a difference value changed from the absolute location of the transmission terminal exchanged in Sidelink RRC signaling between the transmission terminal and the reception terminal.

In operation 402, the reception terminal may determine a range (R1) between itself and the transmission terminal on the basis of the location information of the transmission terminal obtained from the SCI.

In operation 403, the reception terminal may receive a MAC PDU and check reception area (R2) information of the MAC PDU. The R2 information may be included in the MAC header or MAC subheader of the MAC PDU and delivered to the reception terminal. The R2 information may be included in the SLRB information corresponding to the destination index and source index of the MAC PDU, and may be previously known to the reception terminal together with the corresponding destination index, source index, and SL radio bearer (SLRB). The R2 information may be expressed as an actual value (e.g., X meter, Y kilometer, Z centimeter, etc.) corresponding to the reception area or an index value corresponding to the reception area (e.g., integer values 0, 1, 2, 3, . . . ).

In operation 404, the reception terminal may compare R2 and R1 to determine whether R2 is greater than or equal to R1 (or R2 is greater than R1).

If it is determined in operation 404 that R2 is greater than or equal to R1 (or if R2 is greater than R1), the reception terminal may proceed to operation 405 to transmit HARQ feedback for the received MAC PDU. HARQ feedback may correspond to ACK or NAK. If it is determined in operation 404 that R2 is not greater than or equal to R1 (or if R2 is not greater than R1), the reception terminal does not need to transmit HARQ feedback for the received MAC PDU to operation 406.

When the SCI is received in operation 401, but the MAC PDU is not received in operation 403, the reception terminal may not acquire R2 information, so it may not perform a separate operation.

Figure 5:
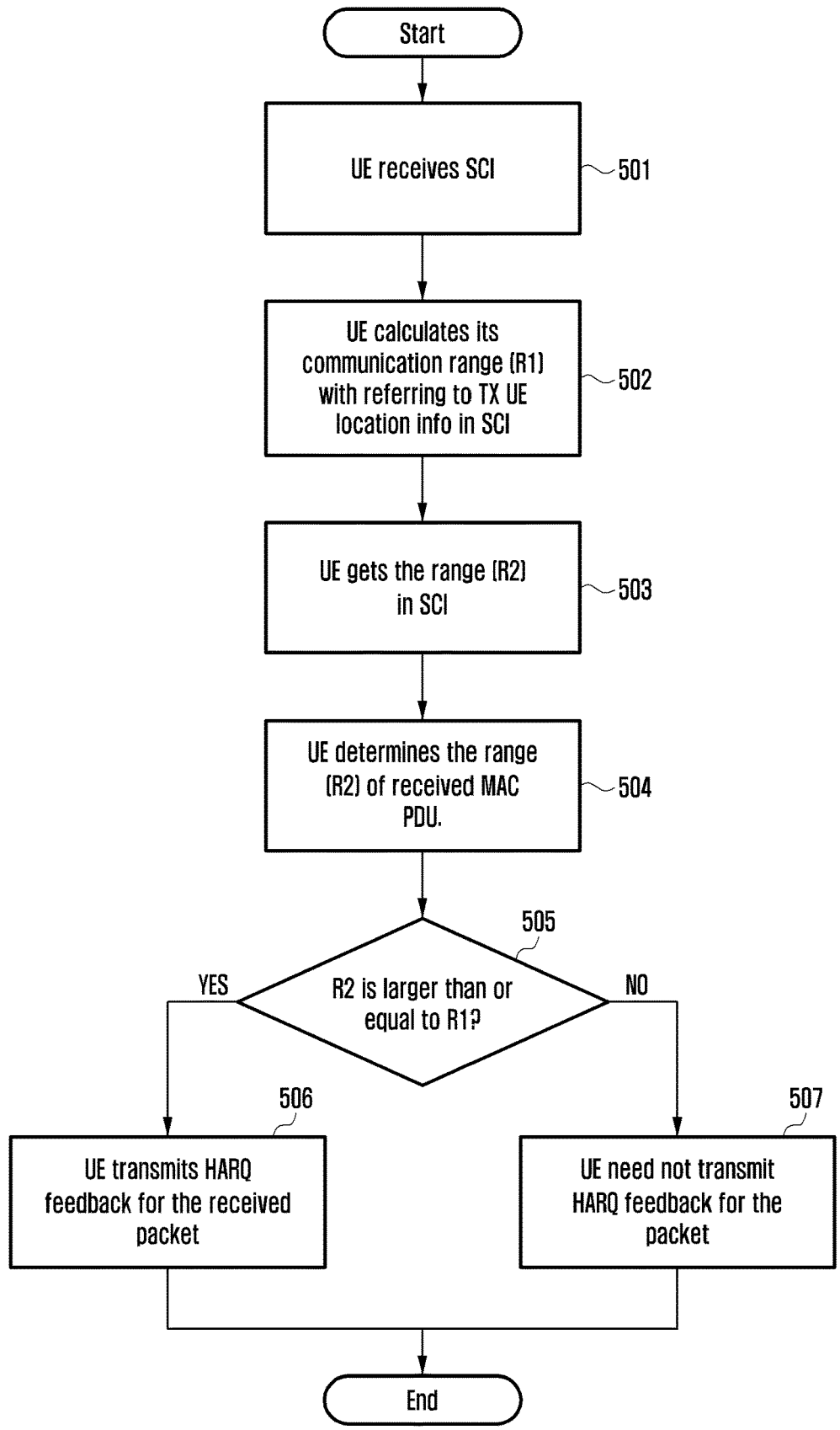
FIG. 5 is a view illustrating an operation of a reception terminal according to an embodiment of the disclosure.

FIG. 5 illustrates an operation of a reception terminal according to an embodiment of the disclosure.

Referring to FIG. 5, in operation 501, the reception terminal may receive the SCI transmitted by a transmission terminal. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may include a difference value changed from the absolute location of the transmission terminal exchanged in Sidelink RRC signaling between the transmission terminal and the reception terminal. The SCI may include reception region (R2) information of a MAC PDU.

In operation 502, the reception terminal may determine a range (R1) between itself and the transmission terminal on the basis of the location information of the transmission terminal obtained from the SCI.

In operation 503, the reception terminal may obtain reception region (R2) information of a MAC PDU from the SCI received in operation 501.

In operation 504, the reception terminal may receive the MAC PDU, and may identify the reception region (R2) information of the MAC PDU on the basis of the SCI of operation 503. As another embodiment, R2 information may be included in the MAC header or MAC subheader of the MAC PDU in addition to the SCI and transmitted to the reception terminal. The R2 information may be included in the SLRB information corresponding to the destination index and source index of the MAC PDU, and may be previously known to the reception terminal together with the corresponding destination index, source index, and SLRB. The R2 information may be expressed as an actual value (e.g., X meter, Y kilometer, Z centimeter, etc.) corresponding to the reception area or an index value corresponding to the reception area (e.g., integer values 0, 1, 2, 3, . . . ).

In operation 505, the reception terminal may compare R2 and R1 to determine whether R2 is greater than or equal to R1 (or R2 is greater than R1).

If it is determined in operation 505 that R2 is greater than or equal to R1 (or if R2 is greater than R1), the reception terminal may proceed to operation 506 to transmit HARQ feedback for the received MAC PDU. HARQ feedback may correspond to ACK or NAK. As another embodiment, if the reception terminal receives the SCI in operation 501 but does not receive the MAC PDU in operation 504, the reception terminal may configure HARQ feedback to NAK and transmit the same.

If it is determined in operation 505 that R2 is not greater than or equal to R1 (or if R2 is not greater than R1), the reception terminal may not need to transmit a HARQ feedback for the received MAC PDU to operation 507.

Figure 6:
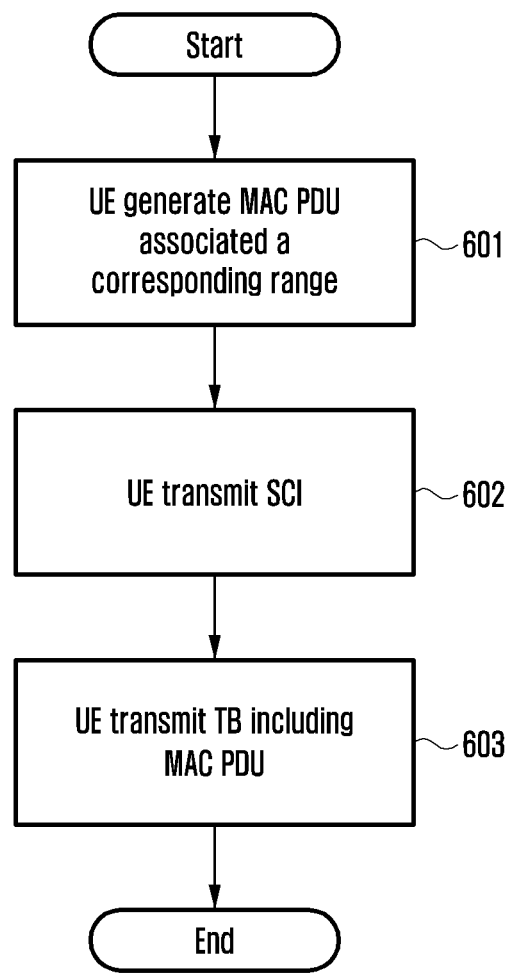
FIG. 6 is a view illustrating an operation of a transmission terminal according to an embodiment of the disclosure.

FIG. 6 is a view illustrating an operation of a transmission terminal according to an embodiment of the disclosure.

Referring to FIG. 6, in operation 601, the transmission terminal may form a MAC PDU consisting of one or more MAC SDUs belonging to the SLRB requiring the same communication range. One or more MAC SDUs multiplexed to the MAC PDU may have the same communication range requirement. In operation 601, the transmission terminal may configure a separate MAC PDU if there is one or more MAC SDUs belonging to the SLRB requiring different communication ranges.

In operation 602, the transmission terminal may transmit the SCI. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may transmit an absolute location in Sidelink RRC signaling transmitted to the reception terminal and include a difference value changed from the absolute location. As another embodiment, the SCI may include the reception area (R2) information of the MAC PDU. The R2 information may be expressed as an actual value (for example, X meter, Y kilometer, Z centimeter, etc.)

corresponding to the reception area or an index value corresponding to the reception area (e.g., integer values 0, 1, 2, 3, . . . ).

In operation 603, the transmission terminal may transmit the MAC PDU configured in operation 601 through the transport block (TB) indicated by the SCI. Then, the transmission terminal may receive HARQ feedback for the MAC PDU. The HARQ feedback may correspond to ACK or NAK.

As another embodiment, when configuring a MAC PDU in operation 601, the transmission terminal may include R2 information corresponding to one or more MAC SDUs multiplexed to the MAC PDU in a header or subheader of the MAC PDU. When R2 information is included in a subheader, it may be included as a subheader of each MAC SDU. In the embodiment of FIG. 6, the range (R2) information included in the subheader of each MAC SDU may have the same value.

According to an embodiment, one or more MAC SDUs having different range requirements corresponding to the SLRB may be multiplexed into one MAC PDU for SLRBs having different communication range requirements of SL packets to SL flows. Even if the communication range requirements of packet 1 and packet 2 are different, they can be multiplexed on the same MAC PDU. The operation of the reception terminal or the transmission terminal for the embodiment will be described with reference to FIGS. 7 to 9.

Figure 7:
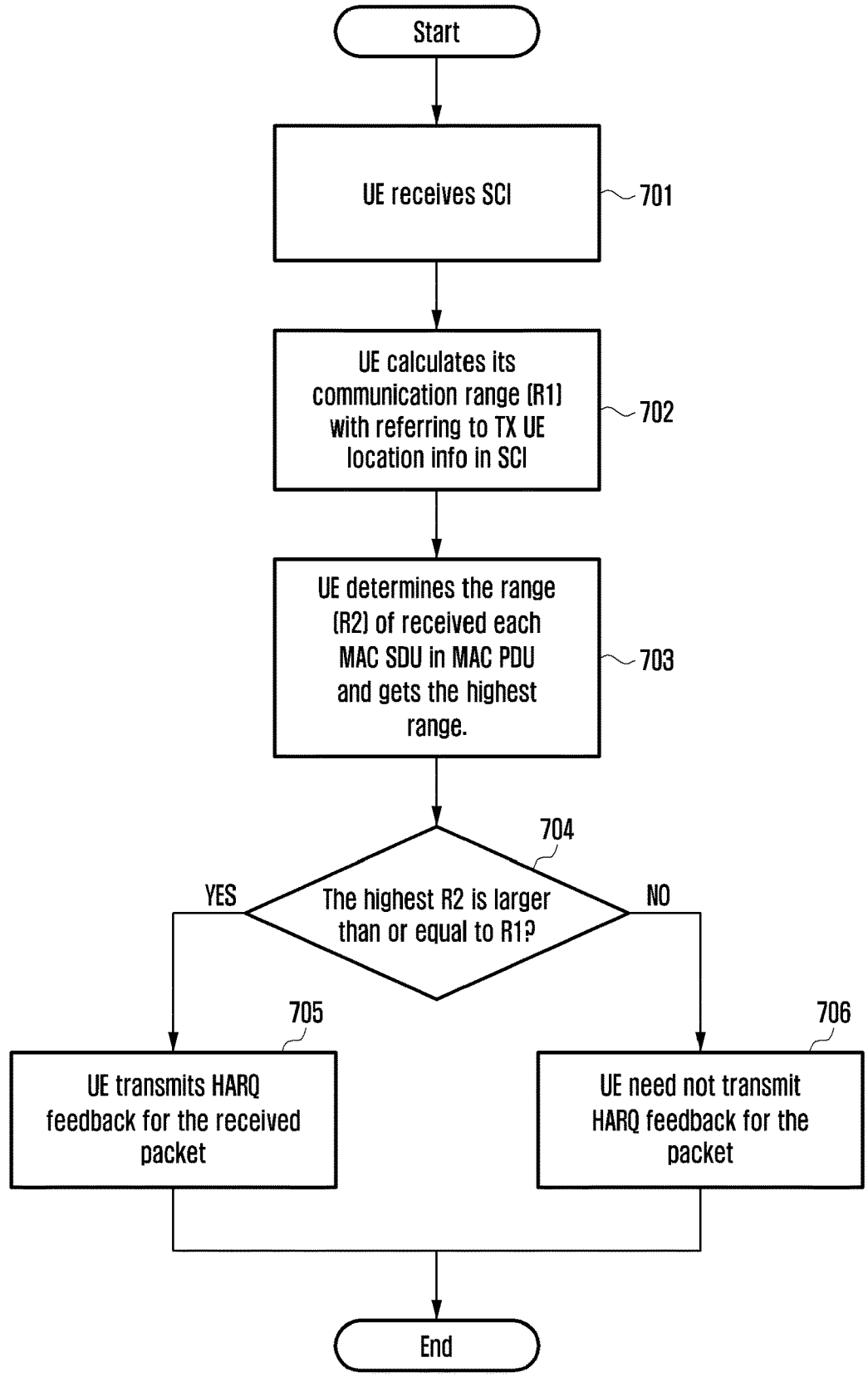
FIG. 7 is a view illustrating an operation of a reception terminal according to an embodiment of the disclosure.

FIG. 7 illustrates an operation of a reception terminal according to an embodiment of the disclosure.

Referring to FIG. 7, in operation 701, the reception terminal may receive the SCI transmitted by the transmission terminal. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may include a difference value changed from the absolute location of the transmission terminal exchanged in Sidelink RRC signaling between the transmission terminal and the reception terminal.

In operation 702, the reception terminal may determine a range (R1) between itself and the transmission terminal based on the location information of the transmission terminal obtained from the SCI.

In operation 703, the reception terminal may receive a MAC PDU and identify reception area (R2) information for each of the one or more MAC SDUs included in the MAC PDU. The reception terminal may obtain the largest R2 value by identifying R2 information for each MAC SDU. The R2 information may be expressed as an actual value (e.g., X meter, Y kilometer, Z centimeter, etc.) corresponding to the reception area or an index value corresponding to the reception area (e.g., integer values 0, 1, 2, 3, . . . ). The R2 information may be included in the MAC header of the MAC PDU or the MAC subheader of the MAC SDU and delivered to the reception terminal. When R2 information may be included in a MAC header of a MAC PDU, the largest R2 value among R2 values of each MAC SDU multiplexed in the MAC PDU may be included. When the R2 information is included in the MAC subheader of the MAC SDU, the R2 value of the corresponding MAC SDU may be included. As another embodiment, the R2 information corresponding to the MAC SDU may be included in destination index, source index, and SLRB information corresponding to the MAC SDU, and may be previously known to the reception terminal together with the corresponding destination index, source index, and SLRB. The R2 information may be expressed as an actual value (e.g., X meter, Y kilometer, Z centimeter, etc.) corresponding to the reception area or an index value corresponding to the reception area (e.g., integer values 0, 1, 2, 3, . . . ).

In operation 704, the reception terminal may determine whether R2 is greater than or equal to R1 (or R2 is greater than R1) by comparing the largest R2 value with R1.

If it is determined in operation 704 that R2 is greater than or equal to R1 (or if R2 is greater than R1), the reception terminal may proceed to operation 705 to transmit a HARQ feedback for the received MAC PDU. The HARQ feedback may correspond to ACK or NAK. If it is determined in operation 704 that R2 is not greater than or equal to R1 (or if R2 is not greater than R1), the reception terminal does not need to transmit HARQ feedback for the received MAC PDU to operation 706.

When the SCI is received in operation 701, but the MAC PDU is not received in operation 703, the reception terminal cannot obtain R2 information and thus may not perform a separate operation.

Figure 8:
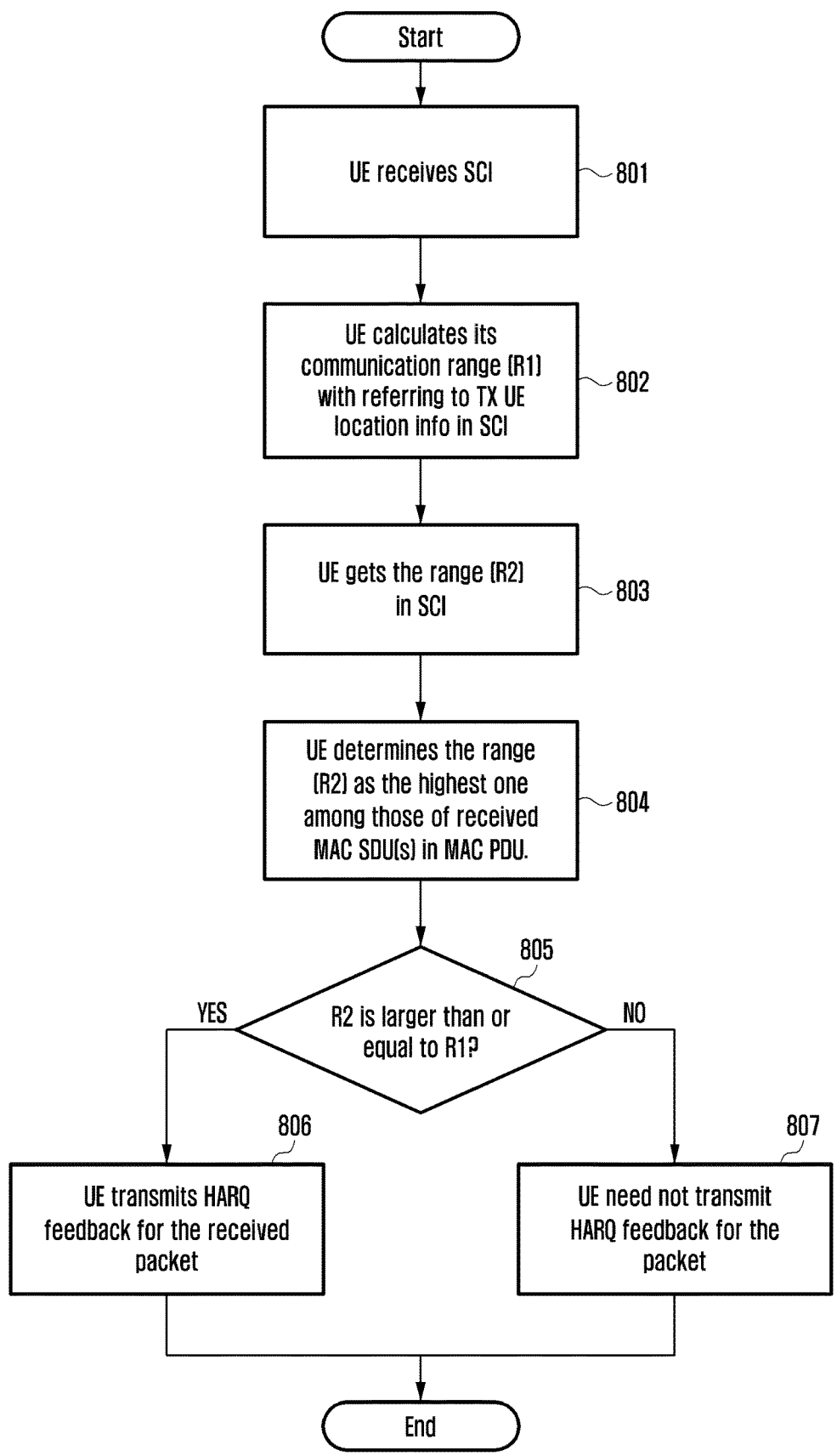
FIG. 8 is a view illustrating an operation of a reception terminal according to an embodiment of the disclosure.

FIG. 8 illustrates an operation of a reception terminal according to an embodiment of the disclosure.

Referring to FIG. 8, in operation 801, the reception terminal may receive the SCI transmitted by the transmission terminal. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may include a difference value changed from the absolute location of the transmission terminal exchanged in Sidelink RRC signaling between the transmission terminal and the reception terminal. The SCI may include MAC PDU reception area (R2) information.

In operation 802, the reception terminal may determine a range (R1) between itself and the transmission terminal based on the location information of the transmission terminal obtained from the SCI.

In operation 803, the reception terminal may obtain the reception area (R2) information of the MAC PDU from the SCI received in operation 801.

In operation 804, the reception terminal can receive the MAC PDU and check the reception area (R2) information of the MAC PDU on the basis of the R2 information of the SCI in operation 801. The R2 information included in the SCI may correspond to R2 having the largest value among R2 values corresponding to one or more MAC SDUs belonging to the MAC PDU. As another embodiment, R2 information may be included in the MAC header or MAC subheader of the MAC PDU in addition to the SCI and transmitted to the reception terminal. When R2 information is included in the MAC header of the MAC PDU, the largest R2 value among the R2 values of one or more MAC SDUs multiplexed in the MAC PDU may be included. When R2 information is included in the MAC subheader of the MAC SDU, the R2 value of the corresponding MAC SDU may be included. As another embodiment, the R2 information corresponding to the MAC SDU may be included in destination index, source index, and SLRB information corresponding to the MAC SDU, and may be known to the reception terminal in advance along with the destination index, source index, and SLRB. The R2 information may be expressed as the actual value (e.g., X meter, Y kilometer, Z centimeter, etc.) corresponding to the reception area or the index value corresponding to the reception area (e.g., integer values 0, 1, 2, 3, . . . ).

In operation 805, the reception terminal may compare R2 and R1 to determine whether R2 is greater than or equal to R1 (or R2 is greater than R1).

If it is determined in operation 805 that R2 is greater than or equal to R1 (or if R2 is greater than R1), the reception terminal proceeds to operation 806 to transmit a HARQ feedback for the received MAC PDU. The HARQ feedback may correspond to ACK or NAK. As another embodiment, if the reception terminal receives the SCI in operation 801 but does not receive the MAC PDU in operation 804, the reception terminal may configure HARQ feedback to NAK and transmit the same.

If it is determined in operation 805 that R2 is not greater than or equal to R1 (or if R2 is not greater than R1), the reception terminal does not need to transmit a HARQ feedback for the received MAC PDU to operation 807.

Figure 9:
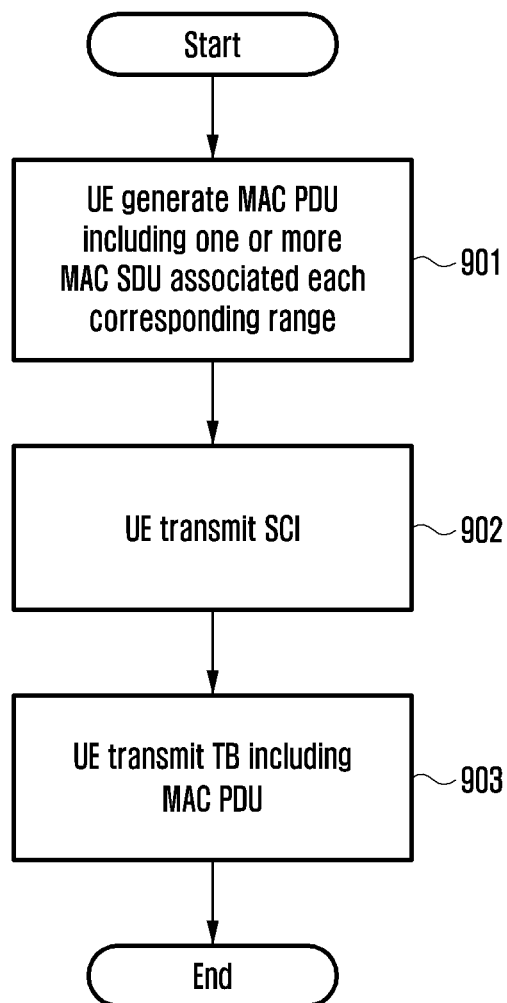
FIG. 9 is a view illustrating an operation of a transmission terminal according to an embodiment of the disclosure.

FIG. 9 illustrates an operation of a transmission terminal according to an embodiment of the disclosure.

Referring to FIG. 9, in operation 901, the transmission terminal may form a MAC PDU. If the MAC PDU is composed of one or more MAC SDUs, the one or more MAC SDUs may belong to an SLRB corresponding to a separate communication range. That is, a plurality of MAC SDUs multiplexed to the MAC PDU may have different communication range requirements.

In operation 902, the transmission terminal may transmit the SCI. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may transmit an absolute location in Sidelink RRC signaling transmitted to the reception terminal and include a difference value changed from the absolute location. As another embodiment, the SCI may include reception area (R2) information of the MAC PDU. The R2 information of the MAC PDU may correspond to R2 having the largest value among R2 values corresponding to one or more MAC SDUs multiplexed to the MAC PDU. The R2 information may be expressed as an actual value (e.g., X meter, Y kilometer, Z centimeter, etc.) corresponding to the reception area or an index value corresponding to the reception area (e.g., integer values 0, 1, 2, 3, . . . ).

In operation 903, the transmission terminal may transmit the MAC PDU configured in operation 901 through the TB indicated in the SCI. Then, the transmission terminal may receive HARQ feedback for the MAC PDU. The HARQ feedback may be ACK or NAK.

As another embodiment, when configuring a MAC PDU in operation 901, the transmission terminal may include R2 information corresponding to one or more MAC SDUs multiplexed to the MAC PDU in a header or subheader of the MAC PDU. The R2 information included in the header of the MAC PDU may correspond to an R2 value having the largest value among R2 values corresponding to each MAC SDU multiplexed to the MAC PDU. The R2 information included in the subheader of the MAC SDU may correspond to the R2 value corresponding to each MAC SDU.

According to an embodiment, SL flow to SL packet communication range requirements corresponding to packets transmitted and received by one or more terminals belonging to the same group may be the same for the group. For example, packets A and B that can be transmitted and received by terminals belonging to group A can have a communication range of 100 meters. Terminals located in an area smaller than or equal to 100 meters can receive the packets A and B and send feedback for the packets A and B. The reception terminal located in an area further than 100 meters may receive the packets A and B, but there is no need to transmit feedback. For example, packets C and D that can be transmitted and received by terminals belonging to group B may have a communication range of 50 meters. Terminals located in an area smaller than or equal to 50 meters can receive the packets C and D and transmit feedback for the packets C and D. The reception terminal located in an area further than 50 meters can receive the packets C and D, but there is no need to transmit feedback. The operation of the reception terminal or the transmission terminal for this embodiment will be described with reference to FIGS. 10 to 11.

Figure 10:
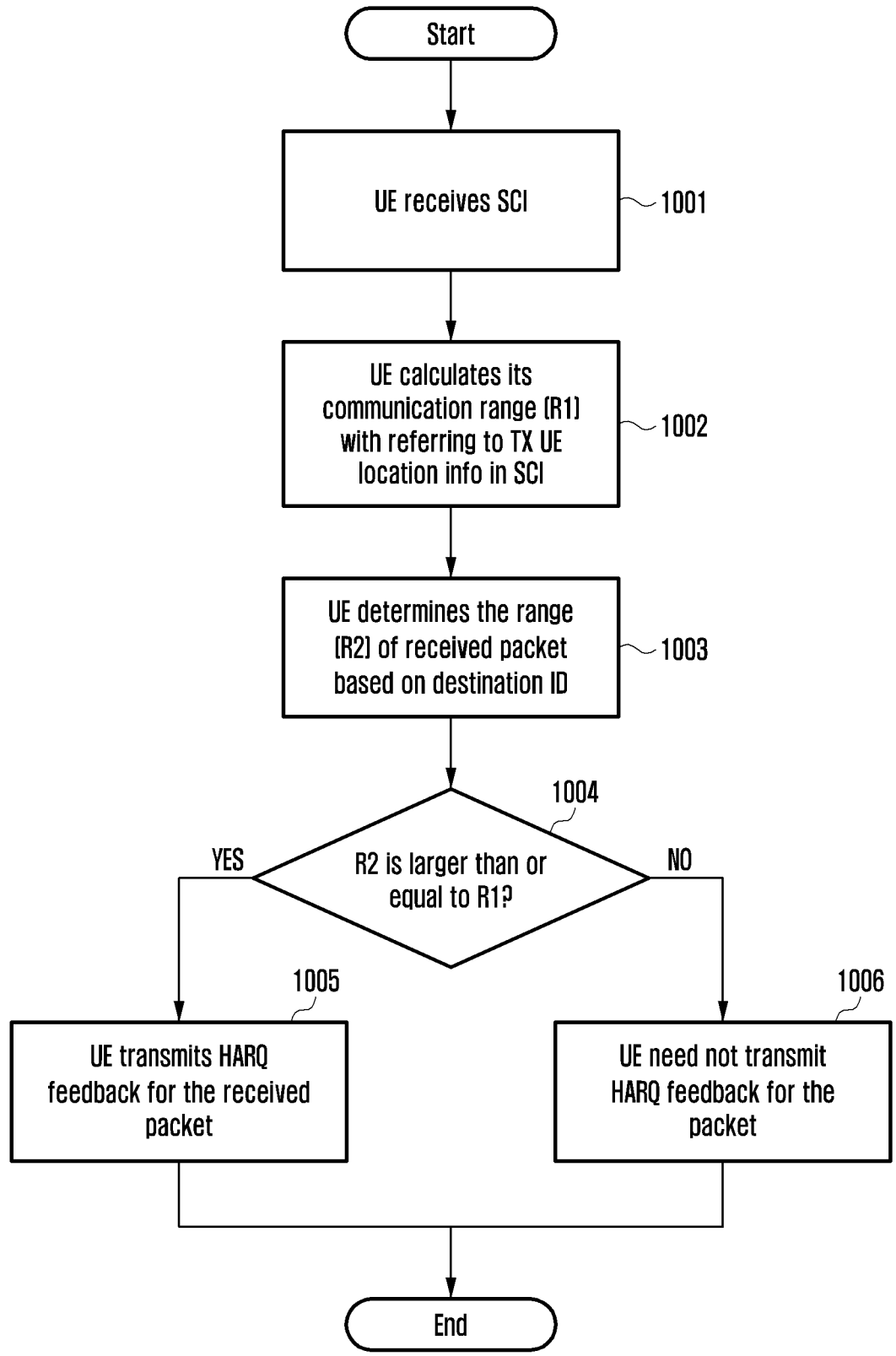
FIG. 10 is a view illustrating an operation of a reception terminal according to an embodiment of the disclosure.

FIG. 10 illustrates an operation of a reception terminal according to an embodiment of the disclosure.

Referring to FIG. 10, in operation 1001, the reception terminal may receive the SCI transmitted by the transmission terminal. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may include a difference value changed from the absolute location of the transmission terminal exchanged in Sidelink RRC signaling between the transmission terminal and the reception terminal.

In operation 1002, the reception terminal may determine a range (R1) between itself and the transmission terminal on the basis of the location information of the transmission terminal obtained from the SCI.

In operation 1003, the reception terminal may receive a MAC PDU and identify reception area (R2) information of the MAC PDU. The reception terminal may identify the R2 information of the group corresponding to the destination index and/or source index on the basis of the destination index and/or source index information of the MAC PDU. That is, the R2 information may be included in SLRB information corresponding to the destination index and source index of the corresponding group, and may be previously known to the reception terminal together with the destination index, source index, and SLRB corresponding to the group. The R2 information may be expressed as an actual value (e.g., X meter, Y kilometer, Z centimeter, etc.) corresponding to the reception area or the index value corresponding to the reception area (e.g., integer values 0, 1, 2, 3, . . . ).

In operation 1004, the reception terminal may compare R2 and R1 to determine whether R2 is greater than or equal to R1 (or R2 is greater than R1).

If it is determined in operation 1004 that R2 is greater than or equal to R1 (or if R2 is greater than R1), the reception terminal may proceed to operation 1005 to transmit a HARQ feedback for the received MAC PDU. The HARQ feedback may correspond to ACK or NAK. If it is determined in operation 1004 that R2 is not greater than or equal to R1 (or if R2 is not greater than R1), the reception terminal does not need to proceed to operation 1006 to transmit a HARQ feedback for the received MAC PDU.

When the SCI is received in operation 1001, but the MAC PDU is not received in operation 1003, the reception terminal may not obtain R2 information and thus may not perform a separate operation.

As another embodiment, when the R2 information can be obtained from the SCI received in operation 1001, when the SCI is received in operation 1001 but the MAC PDU is not received in operation 1003, the reception terminal may perform transmission by configuring a HARQ feedback to NAK.

Figure 11:
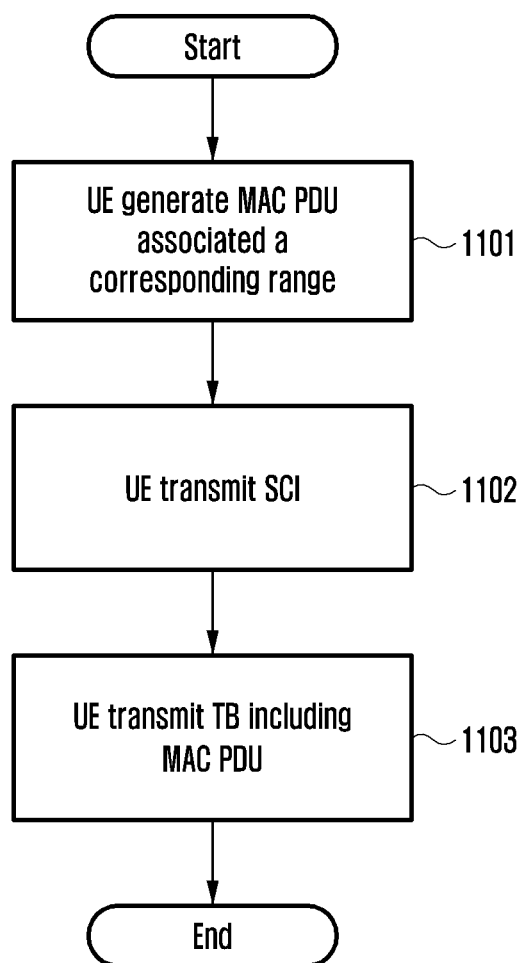
FIG. 11 is a view illustrating an operation of a transmission terminal according to an embodiment of the disclosure.

FIG. 11 illustrates an operation of a transmission terminal according to an embodiment of the disclosure.

Referring to FIG. 11, in operation 1101, the transmission terminal may form a MAC PDU composed of one or more MAC SDUs belonging to the SLRB requiring the same communication range. One or more MAC SDUs multiplexed to the MAC PDU may have the same communication range requirement. The MAC PDU may be transmitted to terminals of a group corresponding to the SLRB having the communication range requirement. R2 information corresponding to destination index, source index, and SLRB of the group may be defined.

In operation 1102, the transmission terminal may transmit the SCI. The SCI may include location information of the transmission terminal. The location information of the transmission terminal included in the SCI may include at least one or a combination of absolute location information, that is, latitude, longitude, height, speed, and zone ID. As another embodiment, the location information of the transmission terminal included in the SCI may transmit an absolute location in sidelink RRC signaling transmitted to the reception terminal and include a difference value changed from the absolute location. As another embodiment, the SCI may include reception area (R2) information corresponding to a communication range of a group targeted for a MAC PDU. The R2 information may be expressed as an actual value (e.g., X meter, Y kilometer, Z centimeter, etc.) corresponding to the reception area or an index value corresponding to the reception area (e.g., integer values 0, 1, 2, 3, . . . ).

In operation 1103, the transmission terminal may transmit the MAC PDU configured in operation 1101 via the TB indicated in the SCI. Then, the transmission terminal may receive a HARQ feedback for the MAC PDU. The HARQ feedback may be ACK or NAK.

As another embodiment, when configuring a MAC PDU in operation 1101, the transmission terminal may include R2 information corresponding to one or more MAC SDUs multiplexed to the MAC PDU in a header or subheader of the MAC PDU. When the R2 information is included in the header, it may be included as a header of the MAC PDU. When the R2 information is included in a subheader, it may be included as a subheader of each MAC SDU. The R2 information may correspond to a communication range of a group that will receive the MAC PDU.

Next, according to various embodiments, sidelink buffer status report (SL BSR) signaling that can be used when a transmission terminal requests a sidelink grant assignment to a base station will be described.

One embodiment of the SL BSR signaling structure is as follows.

| (1) Short SL BSR/Short truncated SL BSR | | |
|---|---|---|
| Destination index$_1$ | LCG ID$_1$ | Buffer size$_1$ |
| Buffer size$_1$ | Destination index$_2$ | |
| LCG ID$_2$ | Buffer Size$_2$ | |
| . . . | | |
| Destination index$_{N-1}$ | LCG ID$_{N-1}$ | Buffer Size$_{N-1}$ |
| Buffer Size$_{N-1}$ | Destination index$_N$ | |
| LCG ID$_N$ | Buffer Size$_N$ | |

The SL BSR signaling structure is similar to the structure of SL BSR used in LTE-based V2X communication. The SL BSR signaling may include at least one of a destination index, a logical channel group index (LCG ID), and a SL buffer size of a packet requiring SL grant. The Short SL BSR may include SL buffer status information for one destination index. Short truncated SL BSR may include SL buffer status information for two or more destination indexes. The destination index, LCG ID, and SL buffer size fields can be used as follows.

Destination Index: The Destination Index field identifies the destination for V2X sidelink communication. The length of this field is 4 or more bits. The value is configured to the index of the destination reported in v2x-destinationInfoList for V2X sidelink communication. If multiple such lists are reported, the value is indexed sequentially across all the lists in the same order as v2x-destinationInfoList.

The V2X-destinationInfoList may be included in V2X assistance information of the terminal that the terminal transmits to the base station. The V2X assistance information of the terminal may be transmitted through a SidelinkUEInformation message and/or UEAssistanceInformation message.

LCG ID: The Logical Channel Group ID field identifies the group of logical channel(s) whose buffer status is being reported. The length of the field is 3 bits;

SL buffer size: the Buffer Size field identifies the total amount of data available according to the data volume calculation procedure in RLC and PDCP across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is X bits.

One embodiment of the SL BSR signaling structure is as follows.

| (2) Long SL BSR | | | | | | | |
|---|---|---|---|---|---|---|---|
| | | | Destination Index | | | | |
| LCG$_7$ | LCG$_6$ | LCG$_5$ | LCG$_4$ LCG$_3$ | | LCG$_2$ | LCG$_1$ | LCG$_0$ |
| | | | Buffer Size 1 | | | | |
| | | | Buffer Size 2 | | | | |
| | | | . . . | | | | |
| | | | Buffer Size m | | | | |

| (3) Long truncated SL BSR | | | | | | | |
|---|---|---|---|---|---|---|---|
| | | | Destination Index 1 | | | | |
| LCG7 | LCG6 | LCG5 | LCG4 LCG3 | | LCG2 | LCG1 | LCG0 |
| | | | Buffer Size 1 | | | | |
| | | | . . . | | | | |
| | | | Buffer Size O | | | | |
| | | | Destination Index 2 | | | | |
| LCG7 | LCG6 | LCG5 | LCG4 LCG3 | | LCG2 | LCG1 | LCG0 |
| | | | Buffer Size 1 | | | | |
| | | | . . . | | | | |
| | | | Buffer Size P | | | | |
| | | | . . . | | | | |
| | | | Destination Index N-1 | | | | |
| LCG7 | LCG6 | LCG5 | LCG4 LCG3 | | LCG2 | LCG1 | LCG0 |
| | | | Buffer Size 1 | | | | |
| | | | . . . | | | | |
| | | | Buffer Size Q | | | | |

The Long SL BSR and Long truncated SL BSR signaling may include at least one of a destination index, a logical channel group index (LCG ID) bitmap, and a SL buffer size of a packet requiring SL grant. The Long SL BSR may include SL BSR for one destination index. The long truncated SL BSR may include SL BSRs for two or more destination indexes. The destination index, LCG ID bitmap, and SL buffer size fields can be used as follows.

Destination Index: The Destination Index field identifies the destination for V2X sidelink communication. The length of this field is 4 or more bits. The value is configured to the index of the destination reported in v2x-destinationInfoList for V2X sidelink communication. If multiple such lists are reported, the value is indexed sequentially across all the lists in the same order as v2x-destinationInfoList.

The V2X-destinationInfoList may be included in V2X assistance information of the terminal that the terminal transmits to the base station. The V2X assistance information of the terminal may be transmitted through a SidelinkUEInformation message and/or UEAssistanceInformation message.

LCGi: For the Long BSR format, this field indicates the presence of the Buffer Size field for the logical channel group i. The LCGi field configured to "1" indicates that the Buffer Size field for the logical channel group i is reported. The LCGi field configured to "0" indicates that the Buffer Size field for the logical channel group i is not reported. For the Long Truncated BSR format, this field indicates whether logical channel group i has data available. The LCGi field configured to "1" indicates that logical channel group i has data available. The LCGi field configured to "0" indicates that logical channel group i does not have data available. The LCGi field may be included for each destination index.

SL buffer size: the Buffer Size field identifies the total amount of data available according to the data volume calculation procedure in RLC and PDCP across all logical channels of a logical channel group after the MAC PDU has been built (i.e. after the logical channel prioritization procedure, which may result in the value of the Buffer Size field being zero). The amount of data is indicated in number of bytes. The size of the RLC and MAC headers are not considered in the buffer size computation. The length of this field for the Long BSR format and the Long Truncated BSR format is Y bits. The Buffer Size fields are included in ascending order based on the LCGi. For the Long Truncated BSR format, the number of Buffer Size fields included is maximized, while not exceeding the number of padding bits. If the value of LCGi is configured as 0, the SL buffer size field corresponding to LCGi may be omitted.

Meanwhile, the destination index reported in SL BSR signaling of (1) to (3), that is, V2X-destinationInfoList may be included in a SidelinkUEInformation message and/or UEAssistanceInformation message transmitted by the UE to the base station. The format of the V2X-destinationInfoList delivered in the SidelinkUEInformation message or UEAssistanceInformation message is as shown in the following embodiments (a), (b) and (c).

---

(a) DST ID per cast type
List of cast type {broadcast, groupcast, unicast}
If (broadcast type)
List of DST ID (0 or more DST ID)
If (groupcast type)
List of DST ID (0 or more DST ID)
If (unicast type)
List of DST ID (0 or more DST ID)

-continued (b) DST ID and cast type
List of DST ID (1 or more DST ID) {
DST ID
Cast type {broadcast, groupcast, unicast}
}
(C) Unique DST ID for all cast types
List of DST ID (1 or more)

---

In the case of (c), the base station should know the mapping information between the DST ID and cast type. The method for the base station to obtain mapping information between the DST ID and the cast type is as follows, for example.

i. The core network informs the base station of the mapping information between the DST ID and the cast type.

ii. The ID space partitioning information corresponding to each cast type is predefined, and the base station knows the same.

iii. The terminal informs the base station of the mapping information between the DST ID and the cast type.

Next, a description will be given of a procedure for a transmission terminal to transmit the SL BSR for receiving the SL grant. Periodic-BSR-TimerSL and/or retx-BSR-TimerSL may be configured for Sidelink BSR reporting. Each sidelink logical channel may correspond to one or a combination of at least a destination, cast type, a source, SL flow, 5QI/PQI, PFI, or a communication range. Each Sidelink logical channel may correspond to the LCG and may be determined according to at least priority of logical channel, PFI, 5QI/PQI, destination, source, or a combination thereof. Information about one or a combination of the LCG ID and at least a priority, PFI, 5QI/PQI, destination, and source mapped to the LCG ID may be configured through logicalChGroupInfoList. The LCG may be designated for at least one of a destination, source, cast type, SL flow, 5QI/PQI, PFI, and communication range or combination thereof.

The triggering condition of the Sidelink Buffer Status Report (BSR) operating in the transmission terminal may include at least one of the following.

if the MAC entity has a configured SL-V2X-RNTI (terminal identifier for sidelink V2X communication):
SL data, for a sidelink logical channel of at least one of a destination, source, cast type, SL flow, 5QI/PQI, PFI, communication range or combination thereof, becomes available for transmission in the RLC entity or in the PDCP entity and either the data belongs to a sidelink logical channel with a higher priority than the priorities of the sidelink logical channels which belong to any LCG belonging to the same at least one of a destination, source, cast type, SL flow, 5QI/PQI, PFI, communication range or combination thereof and for which data is already available for transmission, or there is currently no data available for transmission for any of the sidelink logical channels belonging to the same at least one of a destination, source, cast type, SL flow, 5QI/PQI, PFI, communication range or combination thereof, in which case the Sidelink BSR is referred to below as "Regular Sidelink BSR".
UL resources are allocated and a number of padding bits remaining after a Padding BSR has been triggered is equal to or larger than the size of the Sidelink BSR MAC control element containing the buffer status for at least one LCG of a destination plus its subheader, in which case the Sidelink BSR is referred to below as "Padding Sidelink BSR".

UL resources are allocated and a number of padding bits is equal to or larger than the size of the Sidelink Buffer Status Report MAC CE containing the buffer status for at least one LCG of a destination plus its subheader, in which case the SL BSR is referred to below as 'Padding Sidelink BSR'.

retx-BSR-TimerSL expires and the MAC entity has data available for transmission for any of the sidelink logical channels, in which case the Sidelink BSR is referred to below as "Regular Sidelink BSR".

periodic-BSR-TimerSL expires, in which case the Sidelink BSR is referred to below as "Periodic Sidelink BSR".

NOTE: When Regular Sidelink BSR triggering events occur for multiple logical channels simultaneously, each logical channel triggers one separate Regular Sidelink BSR.

else:

An SL-V2X-RNTI is configured by upper layers and SL data is available for transmission in the RLC entity or in the PDCP entity, in which case the Sidelink BSR is referred to below as "Regular Sidelink BSR".

As another embodiment, a method in which the transmission terminal triggers the Sidelink BSR is as follows.

For Regular Sidelink BSR, the MAC entity shall:

1> if the Sidelink BSR is triggered for a logical channel for which logicalChannelSR-DelayTimerApplied with value of true is configured by upper layers:

2> start or restart the logicalChannelSR-DelayTimer.

1> else:

2> if running, stop the logicalChannelSR-DelayTimer.

According to an embodiment, for the Regular and Periodic Sidelink BSR, the MAC entity of the transmission terminal may perform the following operation.

if the number of bits in the UL grant is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

According to an embodiment, for the Regular and Periodic Sidelink BSR, the MAC entity of the transmission terminal may perform the following operation.

1> if more than one LCG has data available for transmission when the MAC PDU containing the Sidelink BSR is to be built:

2> report Long Sidelink BSR for all LCGs which have data available for transmission.

1> else:

2> report Short Sidelink BSR.

According to an embodiment, for a Padding Sidelink BSR, the MAC entity of the transmission terminal may perform the following operation.

if the number of padding bits remaining after a Padding BSR has been triggered is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

According to an embodiment, for a Padding Sidelink BSR, the MAC entity of the transmission terminal may perform the following operation.

1> if the number of padding bits is equal to or larger than the size of the Short Sidelink BSR plus its subheader but smaller than the size of the Long Sidelink BSR plus its subheader:

2> if more than one LCG has data available for transmission when the Sidelink BSR is to be built:

3> if the number of padding bits is equal to the size of the Short Sidelink BSR plus its subheader:

4> report Short Truncated Sidelink BSR of the LCG with the highest priority logical channel with data available for transmission.

3> else:

4> report Long Sidelink Truncated BSR of the LCG(s) with the logical channels having data available for transmission following a decreasing order of the highest priority logical channel (with or without data available for transmission) in each of these LCG(s), and in a case of equal priority, in increasing order of LCGID.

2> else:

3> report Short Sidelink BSR.

1> else if the number of padding bits is equal to or larger than the size of the Long Sidelink BSR plus its subheader:

2> report Long Sidelink BSR for all LCGs which have data available for transmission.

For Sidelink BSR triggered by retxBSR-TimerSL expiry, the MAC entity considers that the logical channel that triggered the Sidelink BSR is the highest priority logical channel that has data available for transmission at the time the Sidelink BSR is triggered.

If the Buffer Status reporting procedure determines that at least one Sidelink BSR has been triggered and not cancelled:

if the MAC entity has UL resources allocated for new transmission and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart periodic-BSR-TimerSL except when all the generated Sidelink BSRs are Truncated Sidelink BSRs;

start or restart retx-BSR-TimerSL;

else if a Regular Sidelink BSR has been triggered:

if an uplink grant is not configured: or if an uplink grant available for a new transmission does not meet the LCP mapping restrictions configured for the logical channel that triggered the SL BSR:

a Scheduling Request shall be triggered.

As another embodiment, the operation when the transmission terminal uses logicalChannelSR-DelayTimer is as follows.

If the Buffer Status reporting procedure determines that at least one Sidelink BSR has been triggered and not cancelled:

if the MAC entity has UL resources allocated for new transmission and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart periodic-BSR-TimerSL except when all the generated Sidelink BSRs are Truncated Sidelink BSRs;

start or restart retx-BSR-TimerSL;

else if a Regular Sidelink BSR has been triggered and logicalChannelSR-DelayTimer is not running:

if an uplink grant is not configured: or if an uplink grant available for a new transmission does not meet the LCP mapping restrictions configured for the logical channel that triggered the SL BSR:

a Scheduling Request shall be triggered.

NOTE: Uplink resources are considered available if the MAC entity has an active configuration for either type of configured uplink grants, if the MAC entity has received a dynamic uplink grant, or if both of these conditions are met. If the MAC entity has determined at a given point in time that Uplink resources are available, this does not imply that Uplink resources are available for use at that point in time.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in a case where the remaining configured SL grant(s) valid? can accommodate all pending data available for transmission in V2X sidelink communication.

All triggered Sidelink BSRs should be cancelled in a case where the MAC entity has no data available for transmission for any of the sidelink logical channels.

All triggered Sidelink BSRs shall be cancelled when a Sidelink BSR (except for Truncated Sidelink BSR) is included in a MAC PDU for transmission.

All triggered Sidelink BSRs prior to MAC PDU assembly shall be cancelled when a MAC PDU is transmitted and this PDU includes a Sidelink BSR (except for Truncated Sidelink BSR) which contains buffer status up to (and including) the last event that triggered a Sidelink BSR prior to the MAC PDU assembly.

All triggered Sidelink BSRs shall be cancelled, and retx-BSR-TimerSL and periodic-BSR-TimerSL shall be stopped, when upper layers configure autonomous resource selection.

All triggered Sidelink BSRs may be cancelled when the SL grant(s) can accommodate all pending data available for transmission but is not sufficient to additionally accommodate the Sidelink BSR MAC CE plus its subheader.

All Sidelink BSRs triggered prior to MAC PDU assembly shall be cancelled when a MAC PDU is transmitted and this PDU includes a Long or Short Sidelink BSR MAC CE which contains buffer status up to (and including) the last event that triggered a Sidelink BSR prior to the MAC PDU assembly.

NOTE: MAC PDU assembly can happen at any point in time between sidelink grant reception and actual transmission of the corresponding MAC PDU. SL BSR and SR can be triggered after the assembly of a MAC PDU which contains a Sidelink BSR MAC CE, but before the transmission of this MAC PDU. In addition, SL BSR and SR can be triggered during MAC PDU assembly.

The MAC entity shall transmit at most one Regular/Periodic Sidelink BSR. If the MAC entity is requested to transmit multiple MAC PDUs, it may include a padding Sidelink BSR in any of the MAC PDUs which do not contain a Regular/Periodic Sidelink BSR.

All Sidelink BSRs transmitted always reflect the buffer status after all MAC PDUs have been built. Each LCG shall report at the most one buffer status value and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

Next, according to an embodiment, the operation of the SR (scheduling request) for the transmission terminal to receive the SL grant will be described.

The SR configuration of the transmission terminal may be configured as at least one of the following.

The MAC entity may have 0, 1 or more sidelink SR configurations. One SR configuration may be composed of a set of PUCCH resources across one or more BWP and/or cells. BWP and/or cell corresponding to PUCCH resource corresponding to sidelink SR may be designated. As an embodiment, at least one PUCCH resource for SR for one BWP for SLRB may be configured. As another embodiment, for SL logical channel, for one BWP, at most one PUCCH resource for SR use may be configured. As another embodiment, at most one PUCCH resource for SR use may be configured for one BWP for SL flow. As another embodiment, at most one PUCCH resource for SR use may be configured for one BWP for a logical channel group (LCG). Each SR configuration may correspond to one or more logical channels. Each logical channel may be mapped to 0 or 1 SR configuration, and this mapping can be configured by a terminal RRC, a base station, or a terminal implementation. The SR configuration of the logical channel on which the SL BSR is triggered may correspond to the SR configuration on which the SR is triggered. For a logical channel, when the SR resource is configured for sidelink V2X use, at most one PUCCH resource for a normal SR and at most one PUCCH resource for a SL SR may be configured for one BWP.

The following parameters may be defined for the scheduling request procedure.

sr-TransMax (per SR configuration).

SR_COUNTER (per SR configuration).

If the SR is triggered and the SR corresponding to the same SR configuration is not pending, the MAC entity of the transmission terminal may configure SR_COUNTER of the SR configuration as 0.

When the SR is triggered, it may be considered as pending SR until the SR is canceled.

All pending SR(s) shall be cancelled, if all pending SR(s) are triggered by Sidelink BSR, when a MAC PDU is assembled and this PDU includes a Sidelink BSR which contains buffer status up to (and including) the last event that triggered a Sidelink BSR, or, if all pending SR(s) are triggered by Sidelink BSR, when upper layers configure autonomous resource selection, or when the UL grant(s) can accommodate all pending data available for transmission.

All pending SR(s) triggered prior to the MAC PDU assembly shall be cancelled when the MAC PDU is transmitted and this PDU includes a SL BSR MAC CE which contains buffer status up to (and including) the last event that triggered a Sidelink BSR prior to the MAC PDU assembly. All pending SR(s) shall be cancelled when the SL grant(s) can accommodate all pending data available for transmission.

All pending SR(s) triggered prior to the MAC PDU assembly shall be cancelled, if all pending SR(s) are triggered by Sidelink BSR, when a MAC PDU is transmitted and this PDU includes a Sidelink BSR which contains buffer status up to (and including) the last event that triggered a Sidelink BSR prior to the MAC PDU assembly, or, if all pending SR(s) are triggered by Sidelink BSR, when upper layers configure autonomous resource selection.

Only PUCCH resources for Sidelink on a BWP which is active at the time of SR transmission occasion are considered valid.

As long as at least one SR is pending, the MAC entity shall for each pending SR:
1> if the MAC entity has no valid PUCCH resource configured for the pending SR:
2> initiate a Random Access procedure on the SpCell and cancel the pending SR.
1> else, for the SR configuration corresponding to the pending SR:
2> when the MAC entity has an SR transmission occasion on the valid PUCCH resource for SR configured; and
2> if the PUCCH resource for the SR transmission occasion does not overlap with a measurement gap; and
2> if the PUCCH resource for the SR transmission occasion does not overlap with a UL-SCH resource:
3> if SR_COUNTER<sr-TransMax:
4> increment SR_COUNTER by 1;
4> instruct the physical layer to signal the SR on one valid PUCCH resource for SR;
3> else:
4> notify RRC to release PUCCH for all Serving Cells;
4> notify RRC to release SRS for all Serving Cells;
4> clear any configured downlink assignments and uplink grants;
4> clear any PUSCH resources for semi-persistent CSI reporting;
4> initiate a Random Access procedure on the SpCell and cancel all pending SRs.
NOTE 1: The selection of which valid PUCCH resource for SR to signal SR on when the MAC entity has more than one overlapping valid PUCCH resource for the SR transmission occasion is left to UE implementation.
NOTE 2: If more than one individual SR triggers an instruction from the MAC entity to the PHY layer to signal the SR on the same valid PUCCH resource, the SR_COUNTER for the relevant SR configuration is incremented only once.

Figure 12:
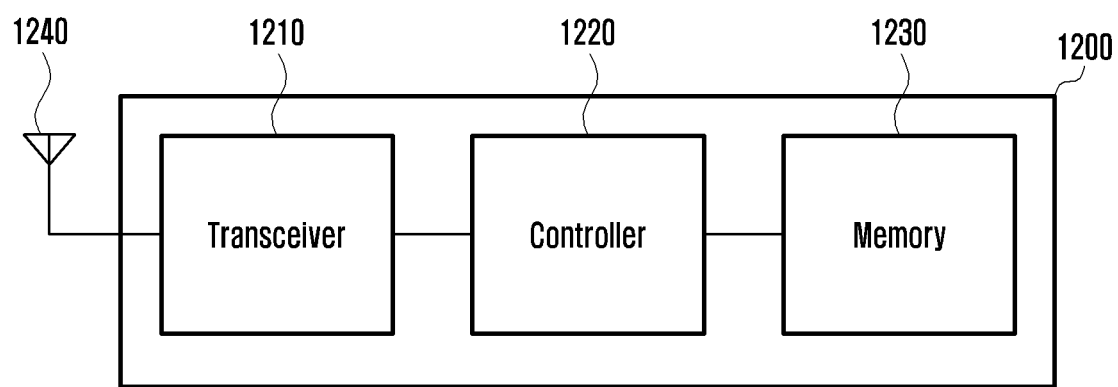
FIG. 12 is a block diagram illustrating an internal structure of a transmission terminal according to an embodiment of the disclosure.
Figure 13:
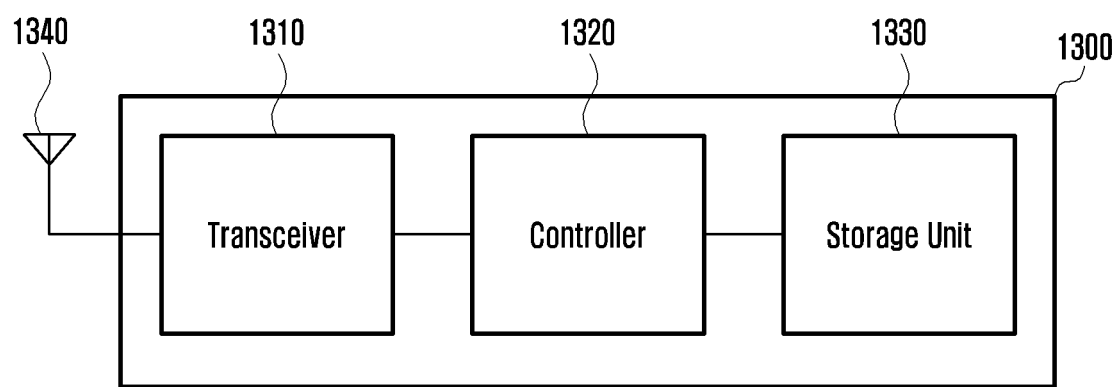
FIG. 13 is a block diagram illustrating an internal structure of a reception terminal according to an embodiment of the disclosure.

An apparatus for carrying out embodiments according to the disclosure is shown in FIGS. 12 and 13.

FIG. 12 is a block diagram illustrating an internal structure of a transmission terminal according to an embodiment of the disclosure.

Referring to FIG. 12, the transmission terminal 1200 of the disclosure may include a transceiver 1210, a controller 1220, and a memory 1230. The transceiver 1210 may transmit/receive a signal to/from a base station or other terminals through an antenna 1240. The signal may include a synchronization signal, a reference signal, control information and data. To this end, the transceiver 1210 may be composed of an RF transmitter for up-converting and amplifying the frequency of the transmitted signal, an RF receiver for low-noise amplifying and down-converting the received signal, and the like. In addition, the transceiver may receive a signal through a wireless channel, output the signal to the controller 1220, and transmit a signal output from the controller 1220 through a wireless channel. The controller 1220 may control a series of processes so that a transmission terminal 1200 can operate according to the above-described embodiment. The controller 1220 may include at least one processor.

FIG. 13 is a block diagram illustrating an internal structure of a reception terminal according to an embodiment of the disclosure.

Referring to FIG. 13, the reception terminal 1300 of the disclosure may include a transceiver 1310, a controller 1320, and a storage unit 1330. The transceiver 1310 may transmit/receive a signal to/from a base station or other terminals through an antenna 1340. The signal may include a synchronization signal, a reference signal, control information, and data. To this end, the transceiver 1310 may be composed of an RF transmitter for up-converting and amplifying the frequency of the transmitted signal, an RF receiver for low-noise amplifying the received signals and down-converting the frequencies, and the like. In addition, the transceiver may receive a signal through a wireless channel, output the signal to the controller 1320, and transmit a signal output from the controller 1320 through a wireless channel. The controller 1320 may control a series of processes so that a reception terminal 1300 can operate according to the above-described embodiment. The controller 1320 may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
generating a medium access control (MAC) protocol data unit (PDU) including a plurality of MAC service data units (SDUs), wherein each MAC SDU of the plurality of MAC SDUs has a communication range value;
identifying a longest communication range value from among communication range values of the plurality of MAC SDUs;
transmitting, to a second terminal, sidelink control information (SCI) including the identified longest communication range value;
transmitting, to the second terminal, the MAC PDU including the plurality of MAC SDUs; and
receiving, from the second terminal, a hybrid automatic repeat request (HARQ) feedback for the MAC PDU, in case that a range identified based on a zone identification is smaller than or equal to a range identified based on the identified longest communication range value.

2. The method of claim 1, wherein at least one of the plurality of MAC SDUs included in the MAC PDU has a different communication range value.

3. The method of claim 1,
wherein the SCI further includes the zone identification associated with the first terminal.

4. A method performed by a second terminal in a wireless communication system, the method comprising:
receiving, from a first terminal, sidelink control information (SCI) including a communication range value;
receiving, from the first terminal, a medium access control (MAC) protocol data unit (PDU) including a plurality of MAC service data units (SDUs);

determining whether a hybrid automatic repeat request (HARQ) feedback for the MAC PDU is transmitted to the first terminal based on the received communication range value; and transmitting, to the first terminal, the HARQ feedback for the MAC PDU based on the determination, in case that a range identified based on a zone identification is smaller than or equal to a range identified based on the received communication range value, wherein the received communication range value is a longest communication range value among communication range values corresponding to the plurality of MAC SDUs.

5. The method of claim 4, wherein at least one of the plurality of MAC SDUs included in the MAC PDU has a different communication range value.

6. The method of claim 4,
wherein the SCI further includes the zone identification associated with the first terminal.

7. A first terminal comprising:
a transceiver; and
a controller configured to:
  generate a medium access control (MAC) protocol data unit (PDU) including a plurality of MAC service data units (SDUs), wherein each MAC SDU of the plurality of MAC SDUs has a communication range value,
  identify a longest communication range value from the communication range values of the plurality of MAC SDUs,
  transmit, to a second terminal via the transceiver, sidelink control information (SCI) including the identified longest communication range value, and
  transmit, to the second terminal via the transceiver, the MAC PDU including the plurality of MAC SDUs, and
  receive, from the second terminal, a hybrid automatic repeat request (HARQ) feedback for the MAC PDU, in case that a range identified based on a zone identification is smaller than or equal to a range identified based on the identified longest communication range value.

8. The first terminal of claim 7, wherein at least one of the plurality of MAC SDUs included in the MAC PDU has a different communication range value.

9. The first terminal of claim 7,
wherein the SCI further includes the zone identification associated with the first terminal.

10. A second terminal comprising:
a transceiver; and
a controller configured to control to:
  receive, from a first terminal via the transceiver, sidelink control information (SCI) including a communication range value,
  receive, from the first terminal via the transceiver, a medium access control (MAC) protocol data unit (PDU) including a plurality of MAC service data units (SDUs),
  determine whether a hybrid automatic repeat request (HARQ) feedback for the MAC PDU is transmitted to the first terminal based on the received communication range value, and
  transmit, to the first terminal via the transceiver, the HARQ feedback for the MAC PDU based on the determination, in case that a range identified based on a zone identification is smaller than or equal to a range identified based on the received communication range value,
  wherein the received communication range value is a longest communication range value among communication range values corresponding to the plurality of MAC SDUs included in the MAC PDU.

11. The second terminal of claim 10, wherein at least one of the plurality of MAC SDUs included in the MAC PDU has a different communication range value.

12. The second terminal of claim 10,
wherein the SCI further includes the zone identification associated with the first terminal.

* * * * *